(12) United States Patent
Jacobs et al.

(10) Patent No.: US 11,177,955 B2
(45) Date of Patent: Nov. 16, 2021

(54) DEVICE-TO-DEVICE MESSAGING PROTOCOL

(71) Applicant: Apple Inc., Cupertino, CA (US)

(72) Inventors: Frederic Jacobs, St. Sulpice (FR); Thomas Icart, Paris (FR); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 16/528,532

(22) Filed: Jul. 31, 2019

(65) Prior Publication Data
US 2020/0235929 A1    Jul. 23, 2020

Related U.S. Application Data

(60) Provisional application No. 62/795,974, filed on Jan. 23, 2019.

(51) Int. Cl.
| | |
|---|---|
| *H04L 9/30* | (2006.01) |
| *H04L 9/08* | (2006.01) |
| *H04L 9/32* | (2006.01) |
| *H04L 9/06* | (2006.01) |
| *H04W 4/70* | (2018.01) |

(52) U.S. Cl.
CPC .......... *H04L 9/3073* (2013.01); *H04L 9/0662* (2013.01); *H04L 9/0847* (2013.01); *H04L 9/3006* (2013.01); *H04L 9/3228* (2013.01); *H04L 9/3297* (2013.01); *H04W 4/70* (2018.02)

(58) Field of Classification Search
CPC ... H04L 9/3228; H04L 9/0891; H04L 9/3215; H04L 9/0877; H04L 9/3247; H04L 2209/80; H04L 9/3297; H04L 9/0825; H04L 9/0662; H04L 9/3006;
(Continued)

(56) References Cited

U.S. PATENT DOCUMENTS

| 8,170,203 B2 | 5/2012 | Ghouti et al. |
| 8,984,602 B1 | 3/2015 | Bailey et al. |

(Continued)

OTHER PUBLICATIONS

McGrew, David A., et al. "Multiple forgery attacks against Message Authentication Codes" Cisco Systems, Inc., May 31, 2005, 8 pgs.
(Continued)

*Primary Examiner* — Mohammad A Siddiqi
(74) *Attorney, Agent, or Firm* — Kilpatrick Townsend and Stockton LLP

(57) ABSTRACT

One embodiment provides for an electronic device, comprising a network interface, a memory coupled with the network interface, at least one application processor coupled with the memory, the at least one processor to execute instructions stored in the memory, and a secure processor including a cryptographic engine, wherein the cryptographic engine is to generate a sealed encrypted message to be transmitted via the network interface, the sealed encrypted message encrypted on behalf of the at least one application processor and includes a signature to enable integrity verification of the sealed encrypted message, the signature generated based on an identity key of the electronic device and data including ciphertext of the encrypted message and a public key of a recipient of the sealed encrypted message.

20 Claims, 17 Drawing Sheets

(58) Field of Classification Search
CPC ...... H04L 9/0847; H04L 9/3073; H04W 4/12; H04W 4/70; H04W 4/80; H04W 4/02; H04W 4/06

See application file for complete search history.

(56) References Cited

U.S. PATENT DOCUMENTS

| | | | |
|---|---|---|---|
| 9,928,379 B1* | 3/2018 | Hoffer | G16H 50/70 |
| 2007/0245147 A1 | 10/2007 | Okeya | |
| 2013/0044876 A1 | 2/2013 | Shaw et al. | |
| 2015/0326550 A1* | 11/2015 | Schropfer | H04L 67/14 726/7 |
| 2016/0269185 A1* | 9/2016 | Stojanovski | H04L 9/0844 |
| 2018/0123804 A1* | 5/2018 | Smith | G06F 21/33 |
| 2019/0140832 A1* | 5/2019 | Leavy | H04L 9/3226 |
| 2020/0025629 A1* | 1/2020 | Zinger | G06F 16/288 |

OTHER PUBLICATIONS

Duong, Thai, et al. "Flickr's API Signature Forgery Vulnerability" Advisory URL: http://netifera.com/research/flickr_api_signature_forgery.pdf, Advisory ID: MOCB-01, Sep. 28, 2009, 8 pgs.

Clem, Douglas, "Hash Length Extension Attacks" published Mar. 30, 2012, downloaded from the internet Nov. 6, 2018, https://www.whitehatsec.com/blog/hash-length-extension-attacks/, 6 pgs.

* cited by examiner

DEVICE-TO-DEVICE MESSAGING PROTOCOL

CROSS-REFERENCE

This application claims benefit of U.S. Provisional Patent Application No. 62/795,974 filed Jan. 23, 2019, which is hereby incorporated herein by reference.

TECHNICAL FIELD

This disclosure relates generally to electronic devices. More specifically, this disclosure relates to a system and associated methods for device-to-device message encryption and authentication.

BACKGROUND

Electronic devices (e.g., computers, tables, mobile phones, televisions, etc.) are increasingly mobile and increasingly connected. As users may interact with multiple electronic devices during a given time period, techniques to synchronize data between user devices may find utility. Additionally, users may wish to exchange messages or data between respective user devices. Thus, techniques to exchange data between devices associated with different users are of use in the art. When data is synchronized between multiple devices of a single user, or when data is exchanged between devices of multiple users, a device-to-device messaging system may be used. Device-to-device messaging systems often include techniques to protect the messages exchanged between devices from eavesdropping or interception, as well as to determine that the sender of a given message is the genuine sender.

SUMMARY

Embodiments described herein provide a device-to-device messaging protocol in which authenticated encryption is enabled without transmitting a MAC with each message. By not transmitting the MAC, the size of each message that is transmitted may be reduced. Even though a MAC is not transmitted, the message can still be verified by the recipient. Instead of the MAC, the device-to-device messaging protocol provides a messaging signing technique that binds the message to the identities (sender/receiver) associated with the message.

One embodiment provides for an electronic device, comprising a network interface, a memory coupled with the network interface, at least one application processor coupled with the memory, the at least one processor to execute instructions stored in the memory, and a secure processor including a cryptographic engine, wherein the cryptographic engine is to generate a sealed encrypted message to be transmitted via the network interface, the sealed encrypted message encrypted on behalf of the at least one application processor and includes a signature to enable integrity verification of the sealed encrypted message, the signature generated based on an identity key of the electronic device and data including ciphertext of the encrypted message and a public key of a recipient of the sealed encrypted message.

One embodiment provides for a method comprising, at an electronic device with one or more processors and memory: fetching, from a key server, a public prekey and device identity key for a recipient of a message to be sent by the electronic device along with a timestamp and signature for the prekey. The method additionally comprises validating the fetched signature of the prekey and prekey timestamp using the fetched device identity public key for the recipient of the message, compose an inner message from a source message and a counter value; encrypt the inner message to generate ciphertext, generate a message signature based on the ciphertext, generate a sealed outer message including the ciphertext and the message signature, and sending the sealed outer message to the recipient of the message via a network interface.

One embodiment provides for a non-transitory machine-readable medium storing instructions to cause one or more processors to perform operations comprising receiving a sealed outer message from a sending device, fetching, from a key server, an identity public key for the sending device, parsing the sealed outer message to retrieve a ciphertext, a public randomized key, and a signature, for a private prekey in a prekey array, decoding and verifying the signature for the sealed message, keys, and ciphertext using the public randomized key and the private prekey, in response to verifying the signature for the sealed message, keys, and ciphertext, deserializing an inner message decoded from the ciphertext to retrieve the plaintext message and a counter value, validating the plaintext via the counter value, and outputting the plaintext message in response to validating the plaintext via the counter value.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Figure 1:
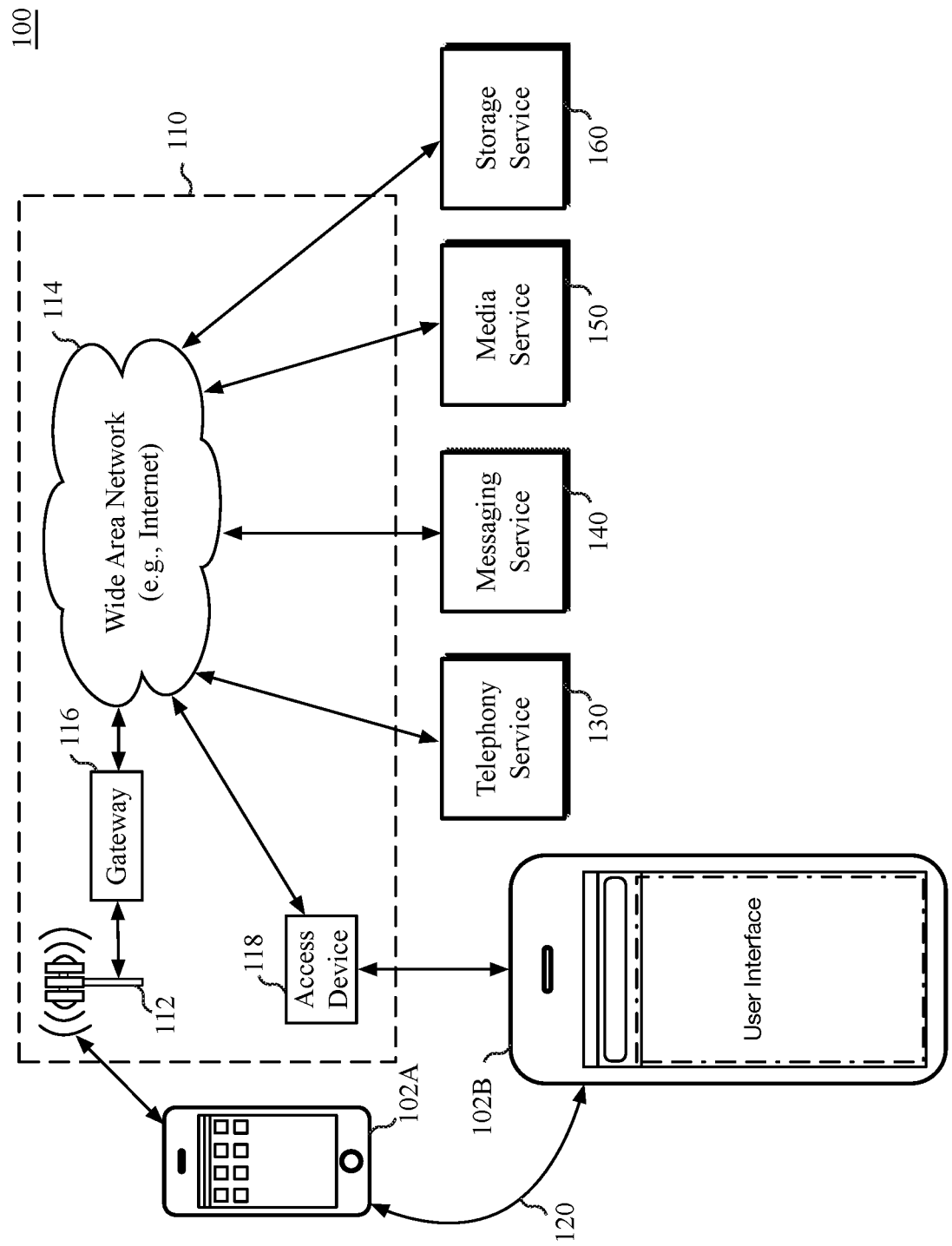
FIG. 1 is a block diagram of an example network operating environment for mobile devices, according to an embodiment.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and Apple Watch® devices from Apple Computer, Inc. of Cupertino, Calif.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2018 Apple Inc.

In the discussion that follows, a computing device that includes a touch-sensitive display is described. It should be understood, however, that the computing device may include one or more other physical user-interface devices, such as a separate display, physical keyboard, a mouse, and/or a joystick. Electronic devices described herein support a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of an example network operating environment 100 for mobile devices, according to an embodiment. Mobile device 102A and mobile device 102B can, for example, communicate over one or more wired and/or wireless networks 110 to perform data communication. For example, a wireless network 112, e.g., a cellular network, can communicate with a wide area network (WAN) 114, such as the Internet, by use of a gateway 116. Likewise, an access device 118, such as a mobile hotspot wireless access device, can provide communication access to the wide area network 114.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-topeer connection 120. The wireless peer-to-peer connection 120 can be used to synchronize data between the devices.

Mobile device 102A or mobile device 102B can communicate with one or more services, such as a telephony service 130, a messaging service 140, a media service 150, and a storage service 160 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. A storage service 160 can provide network storage capabilities to mobile device 102A and mobile device 102B to store documents and media files. Other services can also be provided, including a software update service to update operating system software or client software on the mobile devices. In one embodiment, the messaging service 140, media service 150, and storage service 160 can each be associated with a cloud service provider.

Figure 2:
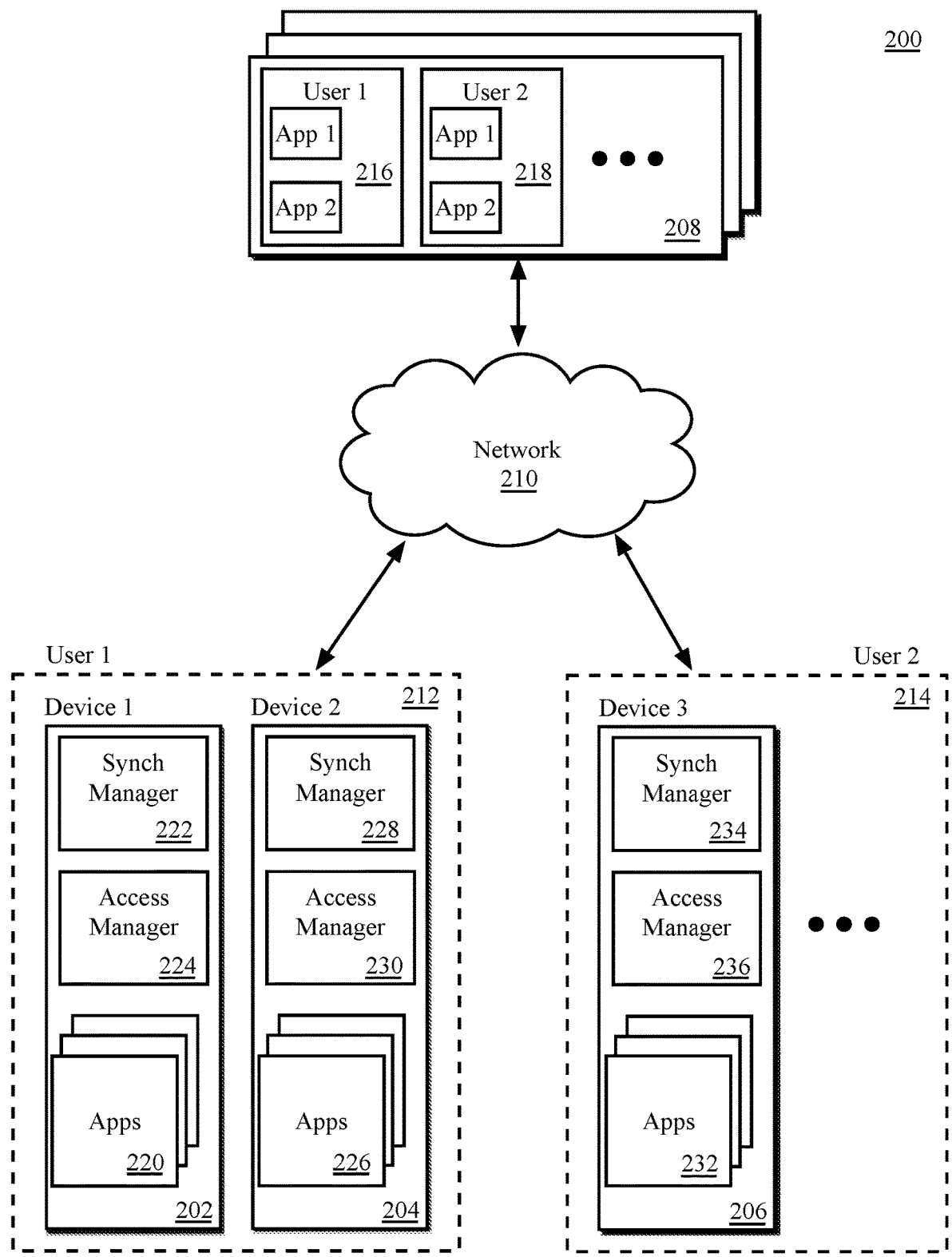
FIG. 2 is a diagram illustrating a system for securely storing data items for synchronization and exchange, according to an embodiment.

FIG. 2 is a diagram illustrating a system 200 for securely storing data items for synchronization and exchange, according to an embodiment. The system 200 includes a first device 202, a second device 204, a third device 206, and a remote storage location 208. The first device 202, second device 204, third device 206, and remote storage location 208 are communicatively coupled together using one or more networks 210. The one or more networks 210 can include both wired and wireless networks. The network 210 can be, for example, part of a local area network, wide area network, or the Internet.

The first device 202, the second device 204, and the third device 206 can include, for example, desktop or laptop computing devices, mobile devices, tablet devices, personal data assistants, wearable devices, television or television set top boxes, smart speaker devices, or other computing devices. In particular, each of the first device 202 and the second device 204 can be associated with a first user or user account 212. Similarly, the third device 206, and one or more other devices not shown can be associated with a second user or user account 214. The remote storage location 208 can additionally be coupled to many other devices, not shown, that are associated with one or more different users or different user accounts.

In one embodiment the devices can be associated with the respective users or user accounts by forming an association between a unique or quasi-unique device key or device identifier for each device with a unique or quasi-unique account key or account identifier for each account. For example, a key or device identifier for the first device 202 and second device 204 can be associated with a key or account identifier for user or user account 212. A key or device identifier for the third device 206 can be associated with a key or user account identifier for user or user account 214. Such association can be used to enable authenticated access to account-based storage on the remote storage location 208. Unique keys or identifiers may be guaranteed to be unique by the use of a central account authority, while a quasi-unique key or identifier may be, for example, a universally unique identifier (UUID) or a globally unique identifier (GUM) that is mathematically likely to be unique.

The remote storage location 208 can be a single storage location or multiple storage locations. For example, a server, a network addressed storage location, a collection of computing devices, or as part of a cloud storage system presenting virtualized network storage. The remote storage location 208 includes separate logical containers for storing data from different users/user accounts and application combinations. In some examples, a logical container could be a directory in a file system, a data structure, a database, or another kind of data organizational unit. For example, the first user or user account 212 can have containers 216 on the remote storage location 208, one for each individual application associated with the user or user account. Similarly, the second user or user account 214 can have containers 218 for respective applications. Application data items received from individual devices (e.g., the first device 202) are stored in respective containers for that application. The remote storage location 208 can include a storage manager that can create and manage containers as well as generate notifications for devices.

The first device 202 includes one or more applications 220, a data synchronization manager 222, and an access manager 224. The one or more applications 220 can include various types of applications such as productivity applications, system applications, games, etc. Each application can be associated with a unique key or other identifier that can be used to identify the application and to identify particular access permissions of that application. In some implementations, one or more applications 220 are sandboxed such that each application is isolated from each other application.

The data synchronization manager 222 manages sending data items to the remote storage location 208 and receiving information (e.g., data items or notifications) from the remote storage location 208. The access manager 224 presents available data items to particular applications of the applications 220 in response to a query from the respective applications. The access manager 224 applies one or more access policies to determine what data items will be visible to a particular application of the applications 220. In some embodiments the data synchronization manager 222 and the access manager 224 can reside in the form of logic instructions in the memory that are executable on one or more of the processors of the electronic devices. In one embodiment the data synchronization manager 222 and access manager 236 can also be implemented as logic executable on an embedded microcontroller within the first device 202.

The second device 204 similarly includes one or more applications 226, a synchronization manager 228, and an access manager 230. The applications 220 and application 226 can include one or more of the same applications. The third device 206 similarly includes one or more applications 232, a synchronization manager 234, and an access manager 236. The illustrated elements of the second device 204 and third device 206 can function in a manner similar to the elements described with respect to the first device 202.

The network operating environment 100 of FIG. 1 and the system 200 for securely storing data items for synchronization and exchange of FIG. 2 are enabled in part a device-to-device messaging system that enables authenticated encryption. Authenticated encryption protects the contents of the message during transmission via encryption, and also enables the message to be authenticated by the recipient, which enables verification that the message was not altered in transit. Traditionally, when a message is encrypted using authenticated encryption, a MAC (message authentication code, sometimes referred to as a tag), is used to authenticate the message. The MAC could then be transmitted by the sender along with the encrypted message to enable the receiver to authenticate the message and detect that a message was not altered in transit. However, the use of a MAC may significantly increase message size. The increased message size can, in some implementations, result in reduced performance and harm overall user experience.

Embodiments described herein provide a device-to-device messaging protocol in which authenticated encryption is enabled without transmitting a MAC with each message. By not transmitting the MAC, the size of each message that is transmitted may be reduced. Even though a MAC is not transmitted, the message can still be verified by the recipient. Instead of the MAC, the device-to-device messaging protocol provides a messaging signing technique that binds the message to the identities (sender/receiver) associated with the message.

Figure 3A:
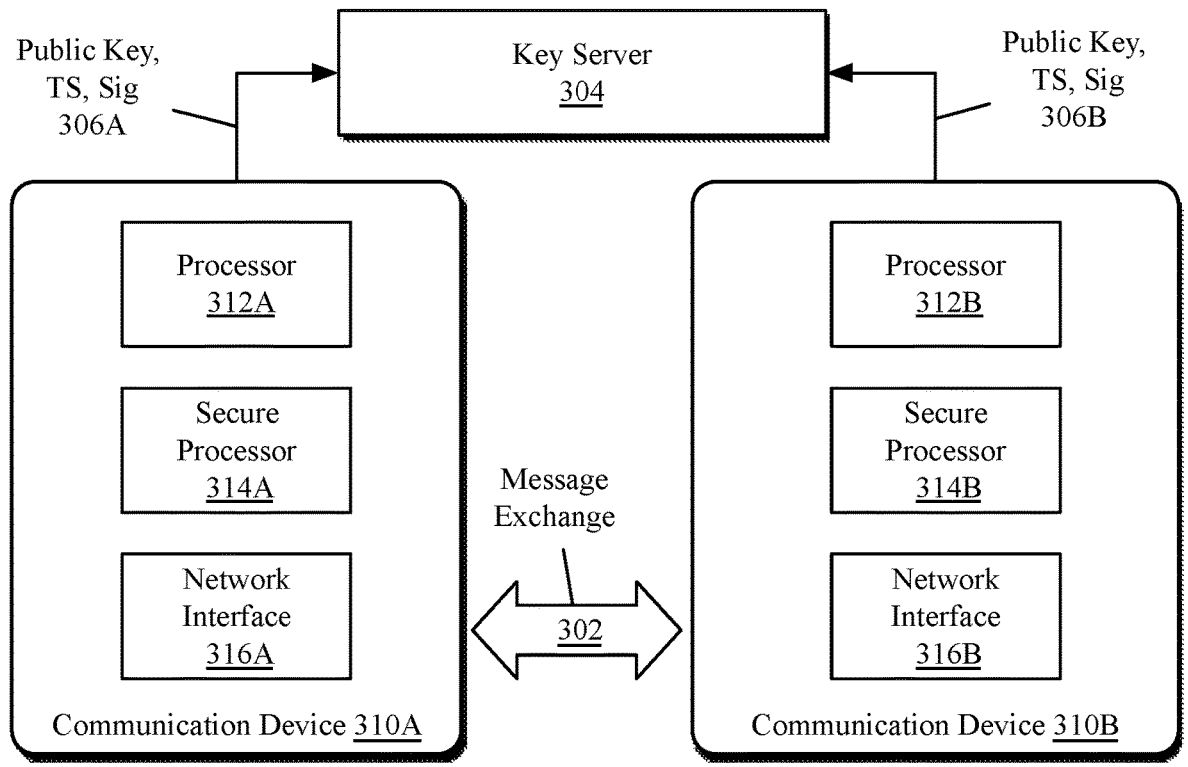
FIG. 3A-3C illustrate devices and a method to device-to-device messaging protocol described herein.
Figure 3B:
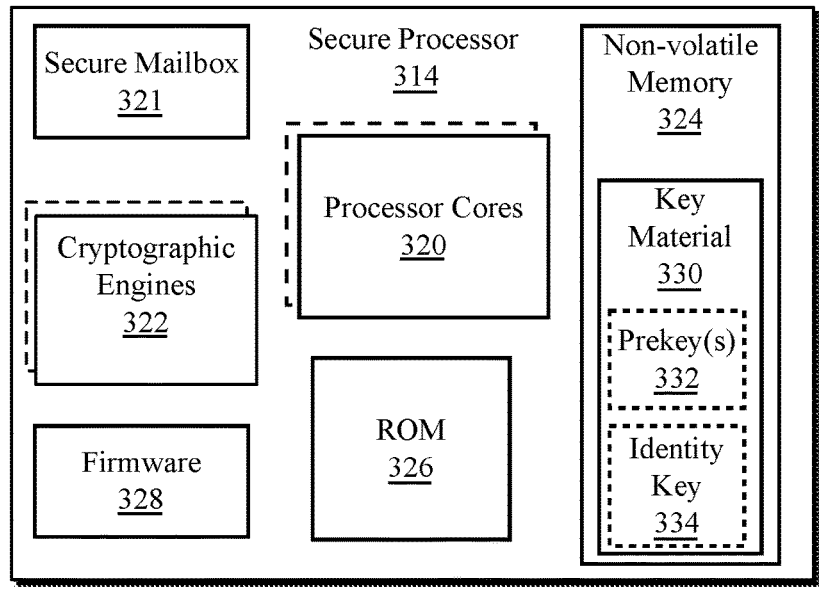
Figure 3C:
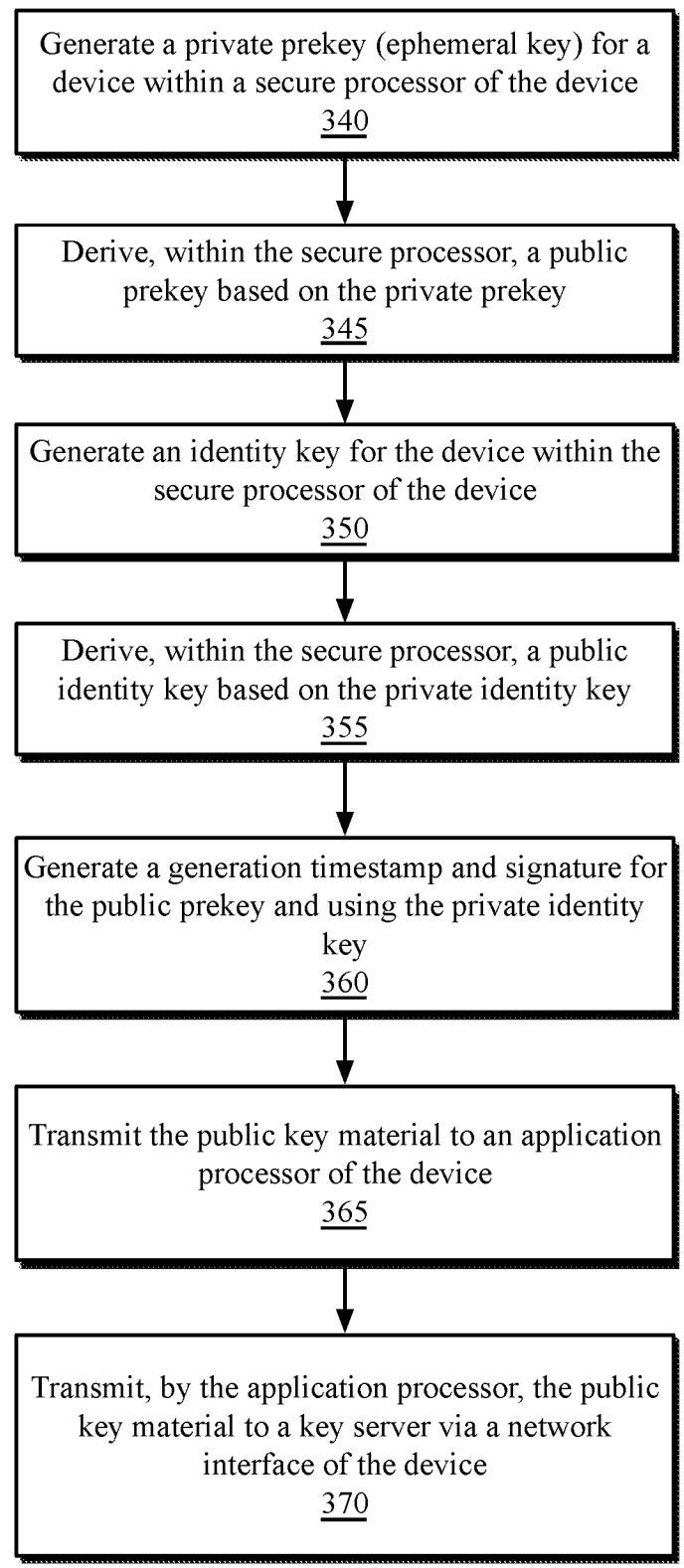

FIG. 3A-3C illustrate devices and a method to device-to-device messaging protocol described herein. FIG. 3A shows a set of communication devices 310A-310B that can participate in a message exchange 302. FIG. 3B illustrates a secure processor 314 that can be used to store device-specific keys used for the device-to-device messaging protocol described herein. FIG. 3C illustrates a method of key generation on the communication devices 310A-310B.

As shown in FIG. 3A, each communication device 310A-310B can include at least one processor 312A-312B, a secure processor 314A-314B, and a network interface 316A-316B. Each communication device 310A-310B can also include other components known in the art, which are not illustrated but are consistent with electronic devices, including mobile electronic devices such as smartphones, tablet computers, laptops, wearable devices, etc. Each communication device 310A-310B can represent any of the devices described herein. Furthermore, each communication device 310A-310B can use any of the services described herein, such as the telephony service 130, messaging service 140, media service 150, and storage service 160 of FIG. 1, and can communicate over the one or more wired and/or wireless networks 110 of FIG. 1 via the network interfaces 316A-316B. When within wireless radio range, the communication devices 310A-310B can also engage in direct device-to-device communication via the network interfaces 316A-316B using a peer-to-peer communication channel. The network interfaces 316A-316B can include multiple wireless antennas, radios, and processors and can be configured to support any number or combination of wired or wireless communication standards described herein, including Ethernet, Bluetooth, NFC, and Wi-Fi.

Operation of the network interfaces 316A-316B can be facilitated by the processors 312A-312B in each device. The processors 312A-312B can be application processors having one or more cores that are used to execute applications on the devices. The processors 312A-312B can also control and sequence the operation of the network interfaces 316A-316B and secure processors 314A. The processors 312A-312B, in combination with the secure processors 314A-314B can be used to enable each communication device 310A-310B to generate multiple sets of keys that are used to encrypt messages that are transmitted and received via a message exchange 302. The keys may be generated for each device pair, for example, using a variant of the Diffie-Hellman (DH) key exchange, including but not limited to Elliptic Curve Diffie-Hellman (ECDH). Public keys 306A-306B that are generated can be transmitted via the network interfaces 316A-316B to a key server 304. Timestamps and signatures associated with the public keys can also be transmitted to the key server 304. The key server 304 can include a key-value store that stores indexed public keys for each communication device 310A-310B. Each communication device 310A-310B can secure at least the private portion of their generated keys using respective secure processors 314A-314B.

As shown in FIG. 3B, the secure processor 314 (e.g., secure processor 314A and secure processor 314B) within each communication device 310A-310B can include one or more processor cores 320, one or more cryptographic engines 322, a secure ROM 326, and non-volatile memory 324, which may be encrypted via the one or more cryptographic engines 322. The secure processor 314 can also include firmware 328, which can be updated to add or modify functionality of the secure processor 314. Communication between the secure processor 314 and the processors 312A-312B of a device can be isolated to an interrupt-driven secure mailbox 321 and shared memory data buffers within secure memory.

In one embodiment the secure ROM 326 is a secure boot ROM that contains immutable code that establishes the hardware root of trust for the secure processor 314. The secure processor 314 can be one of a variety of secure processors, including but not limited to a secure enclave processor (SEP).

In one embodiment each communication device 310A-310B can store key material 330 within non-volatile memory 324 of the secure processor 314. The key material 330 can include or be used to derive multiple device and/or user specific keys. In one embodiment, the key material 330 includes one or more prekeys 332 and an identity key 334. The prekey 332 is an ephemeral key that is frequently rolled along with or some interval of time after other device-specific or user-specific keys are rolled. Messages can be encrypted and decrypted using a set of keys that are derived from the prekey 332. A user may keep multiple prekeys 332 to be able to decrypt messages that have been stored before a key roll and forwarded after a key roll. Each device also has an identity key 334, which is a long-term device signing key that is used to provide identity stability. The identity key 334 can be generated upon initial device setup or when the device is registered with a cloud services account, such as a cloud services account associated with the services of FIG. 1. The identity key 334 is not rolled during regular key rolling operations. Instead, the identity key 334 for the device is re-generated when the device is unregistered from a cloud services account or when the device is erased.

In one embodiment, the prekeys 332 and identity key 334 are not stored directly in the non-volatile memory 324 of the secure processor, but instead are encrypted by one or more additional keys stored within the key material 330 and stored in memory or non-volatile memory used by the application processors (e.g., processors 312A-312B) of the communication devices 310A-310B. In such embodiment, even though the prekeys 332 and identity keys 334 are not directly stored in the secure processor 314, access to the keys is gated by the secure processor 314.

The prekey 332 and identity key 334 can represent an asymmetric key pair having public and private keys. In one embodiment, private versions of the prekey 332 and identity key 334 can be generated or derived based on other keys, such as cloud services account keys or administration keys that are synched across each device associated with a cloud services account. Private versions of the prekey 332 and identity key 334 can also be generated based on a derived shared secret, which can be generated, for example, during an ECDH key exchange. Public key P is derived based on a private key k and a specified elliptic curve domain parameter G. Elliptic curve parameter G is the generator or base point parameter that defines a cyclic subgroup. Using these parameters, a given public key P can be generated, where P=k×G. For example, for user Alice associated with communication device 310A, Alice's private prekey $k_a$ can be used to generate a public prekey $P_a$, where $P_a=k_a×G$. Alice's private identity key $k_A$ for communication device 310A can be used to generate public device identity key $P_A$, where $P_A=k_A×G$. For user Bob associated with communication device 310B, Bob's private prekey $k_b$ can be used to generate a public prekey $P_b$, where $P_b=k_b×G$. Bob's private identity key $k_B$ for communication device 310B can be used to generate public device identity key $P_B$, where $P_B=k_B×G$.

While a secure processor having a cryptographic engine is illustrated, in some embodiments the functionality of the secure processor 314 can be implemented more generally via a secure and/or isolated processing region of a main or application processor. For example, a processor can include a secure enclave or a trusted execution environment in which secure instructions can execute while isolated from the operations of other processor operations. The secure enclave or trusted execution environment can run in parallel with other regions of the processor and may have a separate operating system.

As shown in FIG. 3C, a method of key generation on a device includes to generate a private prekey (ephemeral key) for a device (e.g., communication device 310A-310B) within a secure processor of the device (block 340), such as secure processors 314A-314B. The secure processor can derive a public prekey based on the private prekey (block 345). A timestamp indicating the time of generation for the public prekey is also generated. The secure processor can then generate an identity key for the device within the secure processor of the device (block 350) and derive a public identity key based on the private identity key (block 355). The prekeys are ephemeral and may have a time-to-live attribute. Prekeys can expire and/or be regularly rotated. The identity keys are a long-term key that is used to provide identity stability but can be recreated upon device re-initialization or when the device joins or leaves a cloud-services account. The prekey are used to generate encryption keys, while the identity keys are used for signature generation.

The secure processor, having generated a prekey pair and an identity key pair, can generate a generation timestamp for the public prekey and a signature for the public prekey and timestamp. The signature can be generated using the private identity key for the device (block 360). The secure processor can then transmit public key material to the application processor of the device (block 365). The public key material can include the public prekey, a generation timestamp for the public key, and a signature that is generated based on the public prekey and the generation timestamp. The public key material can additionally include the public identity key of the device. The private keys can be retained within the secure processor or transmitted to the application processor after being encrypted by a key stored only on the secure processor. The private keys, whether stored in the secure processor or encrypted and transmitted to the application processor, are not be accessible to applications that execute on the application processor. The application processor can then transmit the public key material to a key server via a network interface of the device (block 370).

Once keys are generated for a device, the device can participate in encrypted authenticated message exchange with other devices. The message exchange can include any variety of device to device messaging, including instant messaging, voice over Internet Protocol, video over Internet Protocol, cloud storage synchronization, and/or device status synchronization.

Returning to FIG. 3A-3B, in one embodiment key generation, encryption and decryption encryption operations can be enabled by a combination of internal and external functions provided by the secure processor 314. In one embodiment, internal functions within the secure processor 314 can provide the implementation for external functions that are exposed by the secure processor 314. For example, internal functions can be defined within the secure processor 314 that provides variants of ECIES that can be used for the encryption and decryption of message data. The internal functions can be accessed through external functions that are exposed for use by application processors within a device.

For example, to encrypt a message, the application processor (processor 312A) on Alice's device (communication device 310A) can send a message to the secure processor (secure processor 314A) to request the generation of ciphertext C for transmission to user Bob. The ciphertext C can be generated using Bob's public ephemeral key (prekey) $P_b$ and a plaintext message M. Plaintext message M can be a combination of plaintext data and a counter value. Secure processor 314A can read the plaintext message M and public key $P_b$ from secure memory shared with processor 312A in response to a message sent to the secure mailbox of the secure processor 314A. Secure processor 314A can then generate a randomized ECDH key ($k_r$) and an associated public key ($P_r$). Secure processor 314A can then generate a symmetric encryption key ($k_{sym}$) via ECDH, which is derived as $(k_{sym},IV)=KDF((k_r×P_b), MAGIC)$, where IV is an initialization vector, KDF is the key derivation function, and MAGIC is a pre-defined value or sequence that can be used to differentiate the key space used for the device-to-device messaging protocol described herein from the key space used for other protocols that may use similarly derived symmetric encryption keys. In one embodiment, the KDF is HKDF with SHA-256. Secure processor 314A then generates ciphertext C for plaintext message M, such that C=Encrypt ($k_{sym}$, M, IV), where Encrypt is a symmetric encryption algorithm. The IV is an arbitrary number that, along with $k_{sym}$, defines secret data provided to the Encrypt algorithm. The IV can be generated via the KDF along with $k_{sym}$. Secure processor 314A can then return ciphertext C and randomized ECDH public key $P_r$ to processor 312A. A message containing ciphertext C and public key $P_r$ can be sent to Bob's device (communication device 310B) as part of the message exchange 302.

In one embodiment, an internal function is defined within the secure processor 314 to enable message decryption. For example, to decrypt a message, the application processor (processor 312B) of Bob's device can send a message to the secure processor that requests the decryption of ciphertext C, which was sent to Bob from Alice's device. The message can also contain public key $P_r$, which may be received from Alice's device. Secure processor 314B can derive the symmetric encryption key as $(k_{sym},IV)=KDF((P_r×k_b), MAGIC)$. Message M can be decrypted using decryption function Decrypt, such that M=Decrypt ($k_{sym}$, C, IV). Decrypted message M can then be returned to processor 312B.

In addition to encrypting and decrypting message data, encrypted data can be signed by a sender and verified by a recipient. In a classical ECIES scheme, a tag or MAC would also be computed to ensure the authenticity of the message. However, embodiments described herein provide a signature technique that also enables message authentication by binding signed messages to a particular Diffie-Hellman key agreement. This signature technique allows authenticated encryption while excluding the MAC, resulting in reduced message size.

In one embodiment, the signature of the message is generated by the sender using a signature function, where signature=Sign(private_key, data). Sign is a signature generating function, which signs data and returns the signature. Sign can be, but is not limited to the Elliptic Curve Digital Signature Algorithm (ECDSA). The private_key is the signing key that is used to sign the data, which is the private signing key (e.g., identity key 334) of the sender. In one embodiment, the data used generate the signature is $(k_r \times P_b) \| P_b \| P_r \| P_B \| C$. Data portion $(k_r \lambda P_b) \| P_b \| P_r$ includes the multiplication of the private key from the randomized ECDH key pair by the recipient public key concatenated with the recipient ephemeral public key and the public key from the randomized ECDH key pair. Using this data creates a signature that binds the message to a particular Diffie-Hellman key agreement that involves the recipient's identity and the ephemeral key known to the sender. Additionally, $(k_r \times P_b)$ should only be able to be computed by the sender and the receiver of the message. Data portion $P_B$ is the public identity key of the recipient. Use of the recipient's identity key can mitigate an attack where a message would be intercepted and relayed. Ciphertext C for the message is used as part of the data to authenticate the ciphertext and prevent forgery attacks. The tight identity bindings of the signature scheme described herein prevents a passive attacker intercepting the encrypted messages and replaying the intercepted messages using the message signature, as the encryption ephemeral key $k_r$ is used in the signature. The binding to the ephemeral key also restricts an attacker to find a colliding ciphertexts, as the binding authenticates what keys are provided to the encryption operation.

Figure 4A:
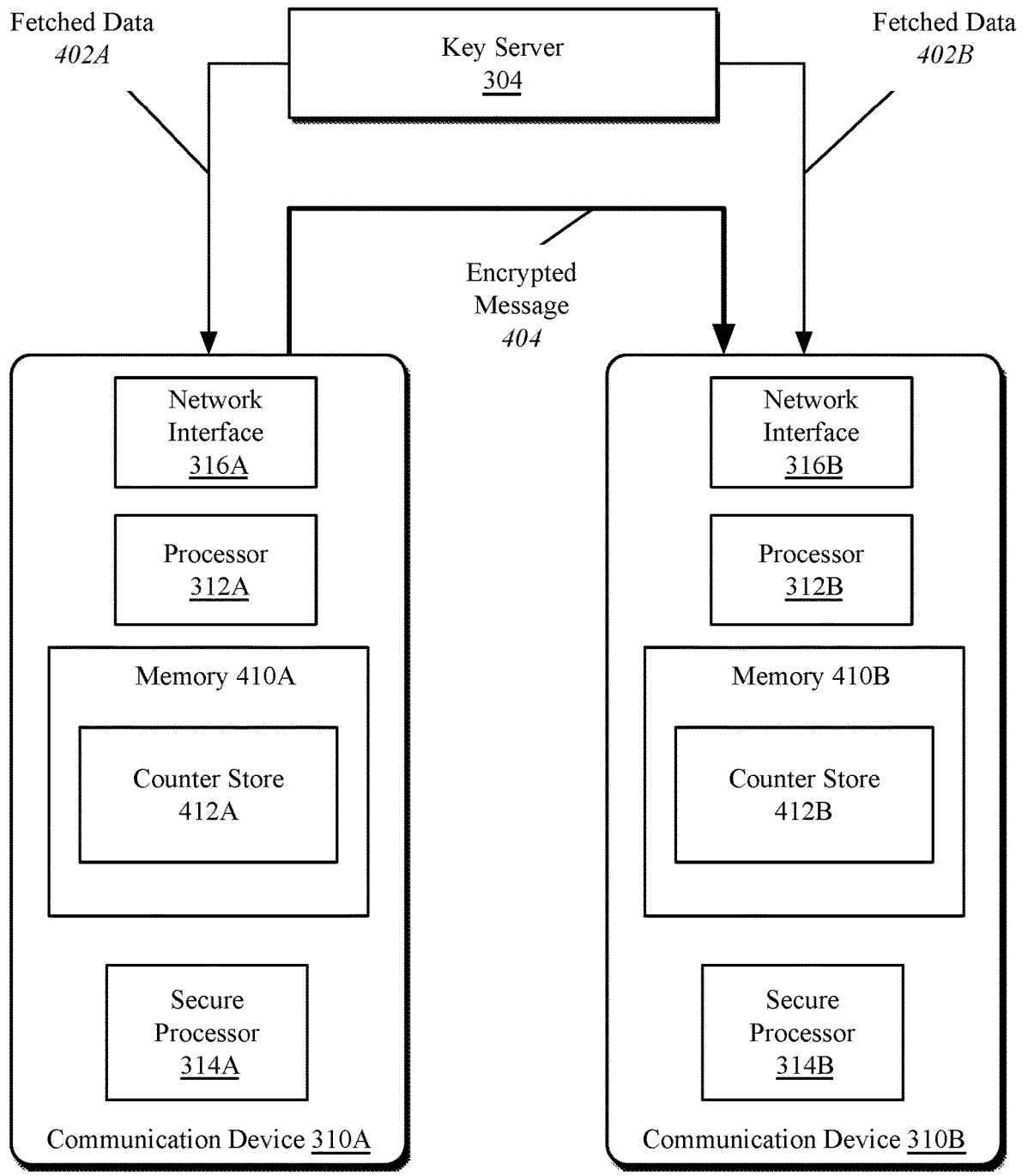
FIGS. 4A-4D illustrate a system and methods to encrypt and decrypt device-to-device messages, according to embodiments described herein.
Figure 4B:
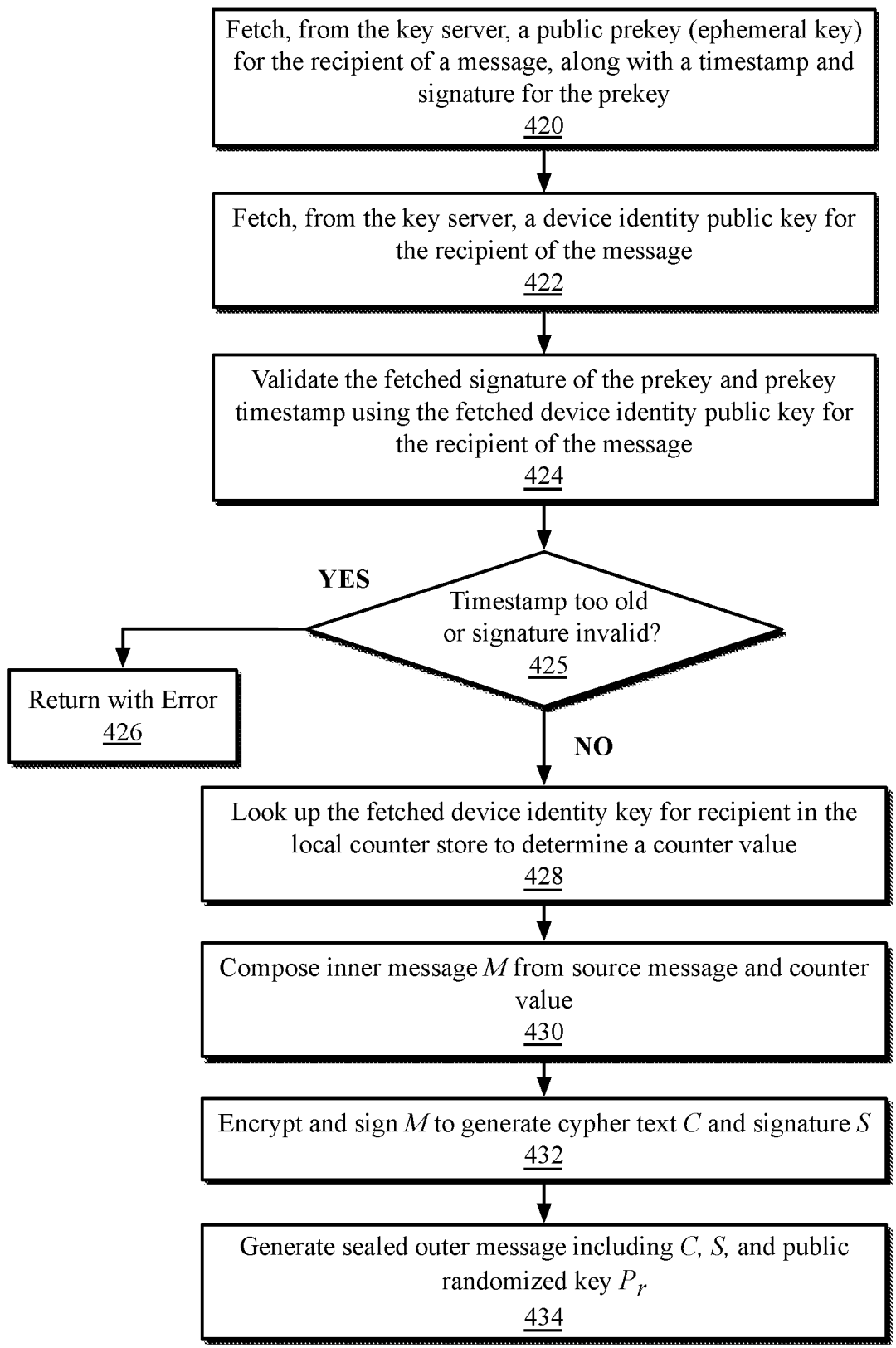
Figure 4C:
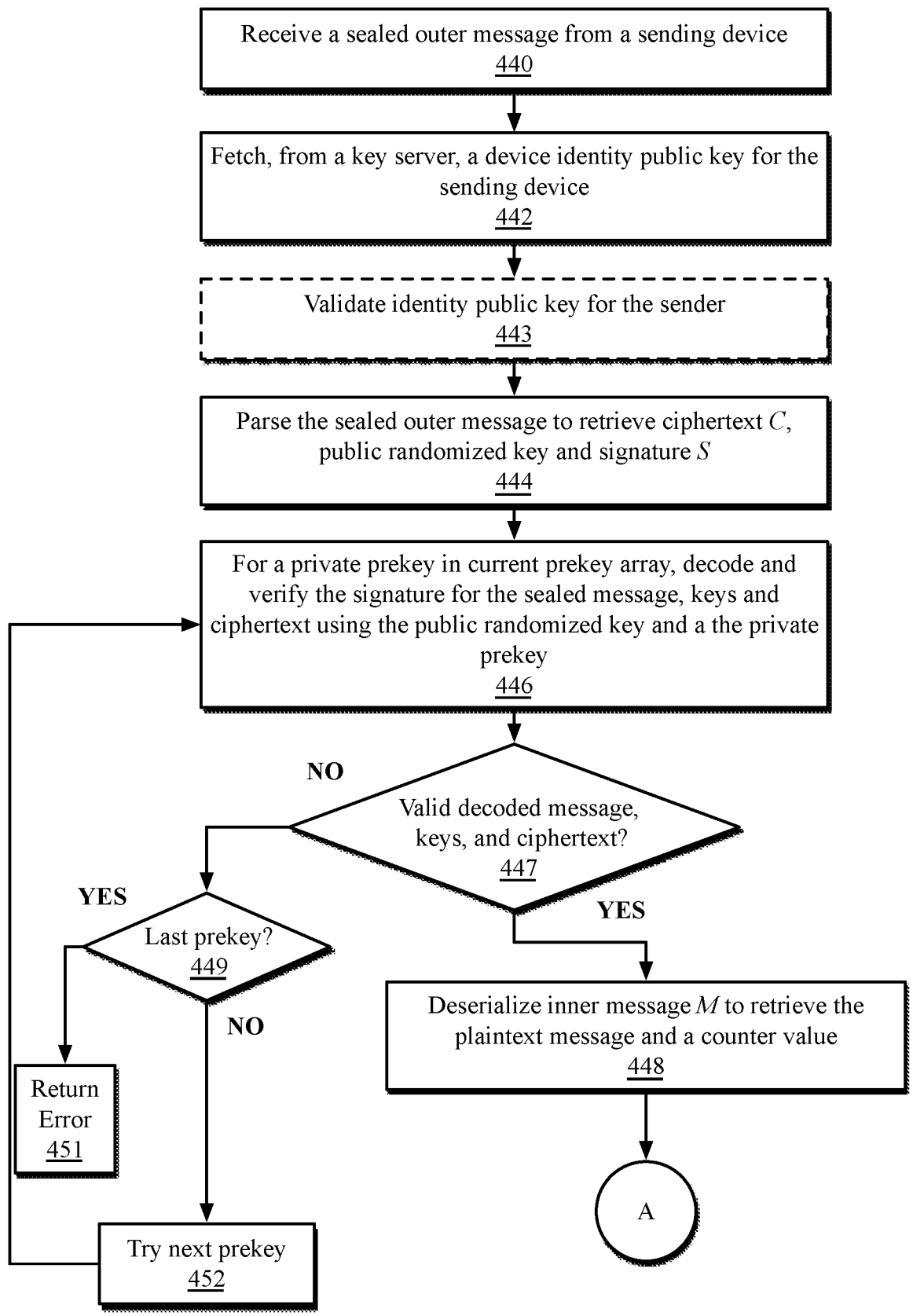

FIGS. 4A-4D illustrate a system and methods to encrypt and decrypt device-to-device messages, according to embodiments described herein. In one embodiment, a device can generate a source message for transmission. The source message can be sealed via authenticated encryption to secure the message contents and prevent message interception or tampering. A recipient device can decode and validate the source message. FIG. 4A illustrates components of the communication devices 310A-310B used to encrypt and decrypt messages. FIG. 4B illustrates a method to encrypt a message, according to an embodiment. FIG. 4C illustrates a method to decrypt a message, according to an embodiment.

As shown in FIG. 4A, communication device 310A can send an encrypted message 404 to communication device 310B. To seal a source message, communication device 310A can use private key data stored in secure processor 314A, fetched data 402A from the key server 304, and counter data stored in a counter store 412A in memory 410A. Communication device 310B can use private key data stored in secure processor 314B, fetched data 402B from the key server 304, and counter data stored in a counter store 412B in memory 410B.

Fetched data 402A for the sending device can include a public prekey key $P_b$ (e.g., ephemeral key) for the recipient of a message. A timestamp for the recipient's public prekey is also fetched from the key server. The timestamp for the recipient prekey is the time in which the ephemeral was generated. A signature for the prekey and timestamp is also retrieved from the key server. The sender of the message also fetches the device identity public key $P_B$ for the recipient of the message. As the device identity public key is specific for the device, the sender, at this point, has identified the device of the recipient user that is to receive the message.

Fetched data 402B for the receiving device can include a fetched identity key $P_A$, which is a sender's device signing public key.

The counter store 412A-412B on each communication device 310A-310B can store a sending counter table and one or more receiving counter tables in memory 410A-410B. In one embodiment the sending counter tables can be formatted as shown in Table 1.

TABLE 1

Sending Counter Table

| Recipient's Device Identity Key (Primary Key) | Current Prekey | Counter Value | Prekey Generation Timestamp |
|---|---|---|---|
| 32 bytes | 32 bytes | 4 bytes (32-bit unsigned integer) | 8 bytes (64-bit unsigned integer) |

The sending counter table maintains state for the outgoing counters for each recipient. A counter lookup can be performed in the sending counter table based on the identity key of the recipient device. In various embodiments, optimizations can be made to the sending counter table to reduce the per-device entry size. In one embodiment the receiving counter tables can be formatted as shown in Table 2.

TABLE 2

Receiving Counter Table

| Sender's Device Identity Key (Primary Key) | Counter Value | Skipped Values |
|---|---|---|
| 32 bytes | 4 bytes (32-bit unsigned integer) | 4 bytes each |

A receiving counter table can be stored for each of the stored local prekeys.

The processors 312A-312B can read counter data from the counter stores 412A-412B in the memories 410A-410B and fetched data 402A-402B from the key server 304 and provide the data to the secure processors 314A-314B, along with a message to be encrypted or decrypted.

Message encryption is shown in FIG. 4B. The sending device can fetch, from the key server, a public prekey (ephemeral key) for the recipient of a message (block 420). The sender can also fetch a timestamp for the recipient's public prekey and a signature for the prekey and timestamp. The sending device can also fetch the device identity public key for the recipient of the message (block 422). As the device identity public key is specific for the device, the sender, at this point, has identified the device of the recipient user that is to receive the message.

Before the encrypting the message, the sending device can validate the fetched signature of the prekey and prekey timestamp (block 424). If the timestamp is older than a threshold age or the signature is incorrect (block 425), the encryption process returns with an error (block 426) and the message cannot be encrypted using the fetched keys. If the timestamp is within a threshold age and the signature is valid, the sending device can look up the fetched device identity key for the recipient in the local counter store to determine a counter value (block 428). If the fetched identity key is not found in the local counter store of the sender, the sending device can create an entry with a sending counter table for the sender that includes an initialized counter value (counter value=0), the pre-key for the recipient, as well as the generation timestamp for the prekey. If the fetched identity key is found, the fetched prekey can be compared with the prekey within the entry in the sending counter table. If the fetched prekey is the same, the associated counter value is incremented. If the fetched prekey is more recent, the prekey of the entry is updated and the counter value is reinitialized. If the fetched prekey is older, then an error is returned.

The sending device can then compose an inner message M from the source message to be sealed and the determined counter value (block 430). The sending device can then encrypt and sign M to generate cipher text C and signature S (block 432). The sending device can then generate a sealed outer message (block 434). The sealed outer message can be a serialized message containing cipher text C, signature S, and public randomized key $P_r$. The message can be encrypted as $(C, (k_r, P_r))=\text{IESEncrypt}(M, P_b)$, where IESEncrypt is an ECIES encryption variant as described above. Signature S can be generated as $S=\text{Sign}(k_A, ((k_r \times P_b) \| P_b \| P_r \| P_B \| C))$. Public key $P_r$ is the public key of the randomized ECDH key pair that is generated during IESEncrypt.

Figure 4D:
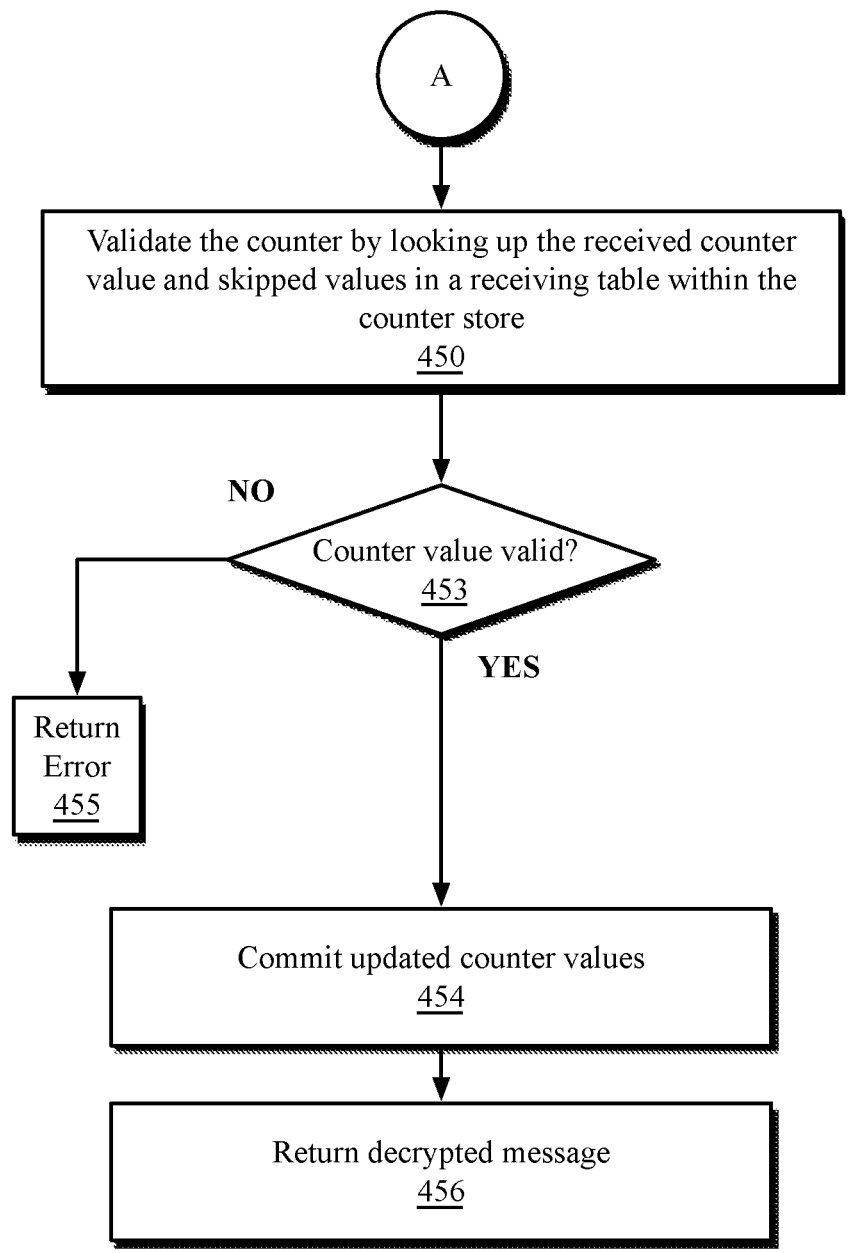

Message decryption is shown in FIG. 4C-4D. As shown in FIG. 4C, the receiving device can receive a sealed outer messaged from a sending device (block 440). The receiving device can fetch an identity key $P_A$ from the key server (block 442). Identity key $P_A$ is the device signing key of the sender device. The sealed device can decrypt the sealed message using prekeys stored in a sorted array of prekeys. The receiving device can optionally validate the identity public key for the sender (block 443). In one embodiment, the receiving device can validate the identity public key using an out-of-band hexadecimal comparison validation or key transparency system. The validation and/or transparency system can verify that the public keys vended by the key server are the intended keys. Such validation systems can mitigate the risk of misbehavior from key server and/or connections to the key server. In one embodiment, the key transparency system used can be a separate validation infrastructure that enables the authentication of a set of public keys that are known to be associated with a user, device, or account. In one embodiment, a fingerprint for the public identity key can be created and stored in the key transparency system database, or another separate database, allowing the recipient to verify a retrieved public identity key. In one embodiment, the fingerprint, or other verification data, can be relayed via in an out-of-band data channel to the recipient device. For example, device-to-device messaging can be performed over multiple data channels or data transports, with verification data sent over a separate channel or via a separate data transport.

The receiving device includes a sorted array of prekeys that are more recent than (N×(Rotation Interval)), where N can vary across embodiments. In one embodiment, N=2, although other values may be used. The order of the array is from the most recent to the oldest key for performance reasons. The receiving device can parse the sealed outer message to retrieve ciphertext C, public randomized key $P_r$, and signature S (block 444). Then, for a private prekey $k_{prekey}$ in the current prekey array, the receiving device can decode and verify the sealed message using the public randomized key $P_r$ and the private prekey $k_{prekey}$ (block 446). The decode operation can generate inner message M, from outer message msg such that $M=\text{IESDecrypt}(\text{msg}, P_r, k_{prekey})$. Verification can be performed using the function $\text{valid}=\text{Verify}(P_A, ((P_r \times k_{prekey}) \| P_{prekey} \| P_r \| P_B \| C), S)$. If the decoded message, keys, and ciphertext are not valid (block 447), and the receiving device has not attempted all current prekeys (block 449), the receiving device can try the next prekey (block 452). If the receiving device has attempted all current prekeys, the decryption operation can return an error (block 451). If the decoded message, keys, and ciphertext are valid (block 447), the receiving device can proceed to deserialize inner message M to retrieve the plaintext message and a received counter value (block 448).

Continuing to FIG. 4D, the receiving device can then validate the counter by looking up the counter value and skipped values in a receiving table within the counter store, which is indexed based on the sender's device identity key (block 450). If there is no counter associated with a sender identity in the receiving counter table, the receiving device can mark the counter as valid and set the counter value within the table to the new counter value. If a value is found, then if (new_counter−stored_counter_value)=1, the receiving device can set the counter as valid and increment stored_counter_value. If (new_counter−stored_counter_value)>1, the receiving device can set the counter as valid and save intermediary values [stored_counter_value+1: new_counter−1] as skipped values in the receiving counter table entry. The stored_counter_value is then set to the new counter. Intermediary values are stored to allow out of order delivery, as in some embodiments in-order delivery is not guaranteed. If (new_counter<stored_counter_value) the intermediate (skipped) values are checked. If the new_counter is in the skipped values, the new_counter is marked as valid and removed from the skipped values. If, based on the above, the counter value is considered valid (block 453), then the receiving device can commit the updated counter values (block 454) and return the decrypted message (block 456). If the counter value is not valid, the decryption operation can return an error (block 455).

Figure 5:
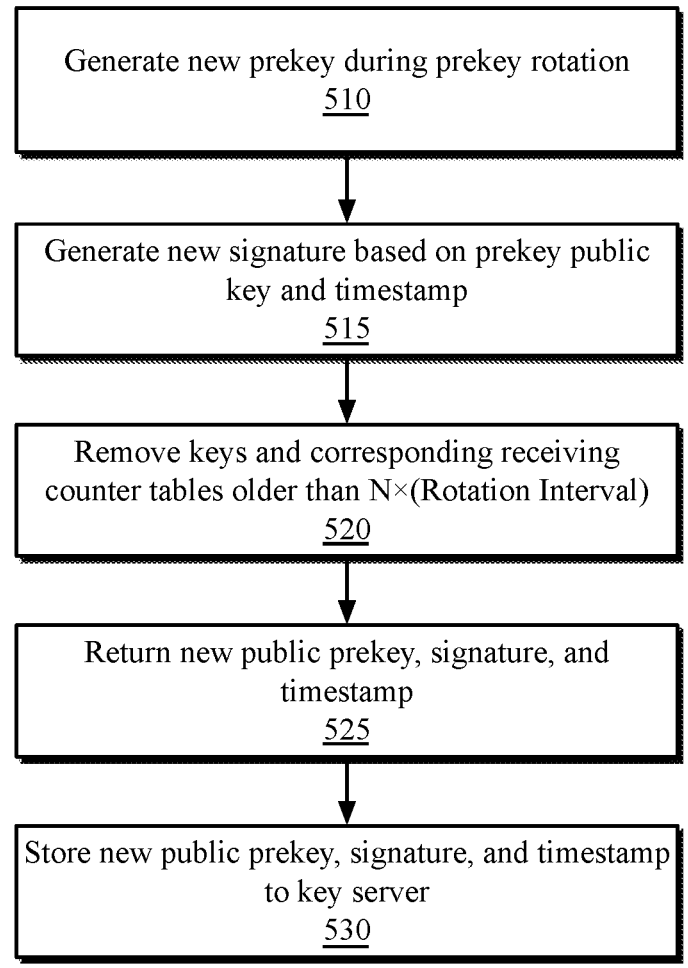
FIG. 5 illustrates a method to facilitate prekey rotation on electronic devices described herein.

FIG. 5 illustrates a method to facilitate prekey rotation on electronic devices described herein. During, or some interval of time after other device-specific or user-specific keys are rolled, a device can generate a new prekey (block 510). The device can then generate a new signature based on the prekey public key and generation timestamp (block 515). The device can then remove keys and corresponding receiving counter tables older than N×(Rotation Interval) (block 520). The value for N can vary across embodiments. In one embodiment, N=2. In one embodiment the prekey rotation is performed at least in part using a secure processor of the device. The secure processor can return a new public prekey, signature, and timestamp to an application processor of the device (block 525). The application processor of the device can then store the new public prekey, signature, and timestamp to the key server (block 530).

Using authenticated encryption techniques described herein, a prekey compromise on either side does not allow an adversary to maintain decryption capability beyond the rotation to a new prekey. Outside of the range of the use of the compromised prekey, perfect forward secrecy and future secrecy is maintained. Additionally, a secure processor within the device protects ephemeral encryption keys and signing keys. Various embodiments described herein can be applied to the systems described below.

Figure 6:
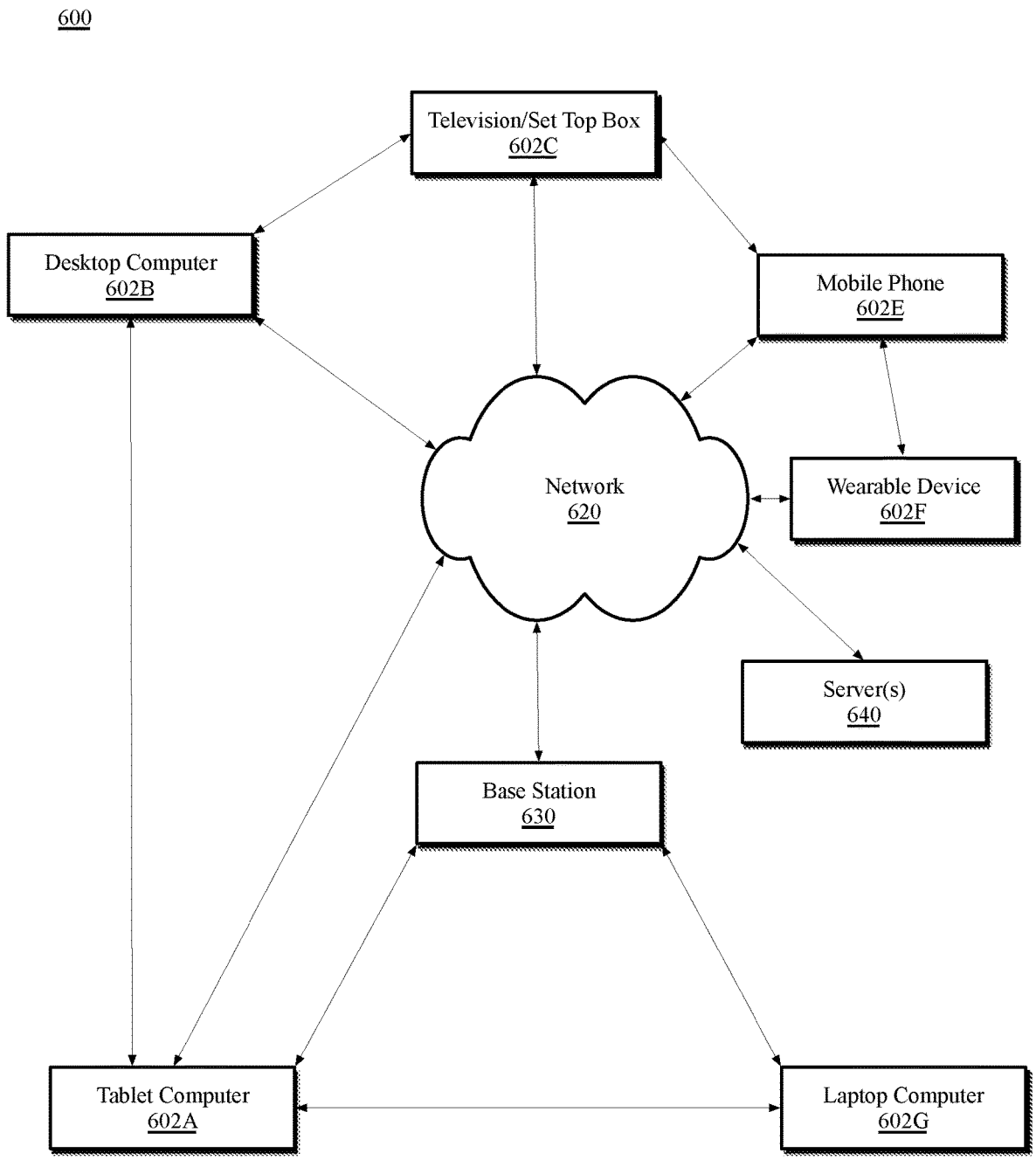
FIG. 6 is a schematic illustration of an overview of a network environment in which device-to-device communication may be implemented, according to some embodiments.

FIG. 6 is a schematic illustration of an overview of a network environment 600 in which device-to-device communication may be implemented, according to some embodiments. The network environment 600 can include one or more electronic devices such as a tablet computer 602A, a desktop computer 602B, a television or set top box 602C, a mobile phone 602E, wearable device 602F, and/or a laptop computer 602G, which may be referred to collectively as electronic devices 602. Electronic devices 602 within range of one another can establish a peer-to-peer communication channel via a direct communication link (e.g., a Bluetooth link, an infrared (IR) link, or the like). Further, the electronic devices 602 can be connected to a network 620, either directly or via a connection to a base station 630. The base station 630 can be, for example, a network access device (e.g., a router, cellular base station or the like) which provides the electronic devices 602 with network access.

The network 620 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 620 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH).

The various electronic devices 602 can establish a connection with a remote storage location located on one or more servers 640. The remote storage location can be, for example, the remote storage location 208 of FIG. 2. The remote storage location on the one or more servers 640 can be used to synchronize data between the electronic devices 602. In addition to a synchronized data store, the electronic devices 602, if associated with an account or a family of accounts on the one or more servers, can synchronize device behavior and/or activity information between the devices. Synchronized device behavior or activity information can include, for example, device movement data, user health data, and/or an amount of time spent using a particular application. Other types of device behavior or user information that can be synchronized are described below.

The device behavior synchronization can facilitate seamless transition between devices as the user transitions from device to device. For example, user actions or activity performed on a tablet computer 602A can be synchronized with a mobile phone 602E of the user when the user transitions from use of the tablet computer 602A to the mobile phone 602E. In one embodiment, device behavior or activity information can transition between any of the illustrated electronic devices 602 within the network environment 600. Synchronization can be performed via the network 620 using the one or more servers 640 or can be performed via a peer-to-peer connection between the electronic devices 602.

Before a peer-to-peer communication channel is established between electronic devices 602, a peer discovery and pairing process is performed between the devices. The peer discovery process enables the electronic devices 602 to discover and preemptively establish connections between before data is available to be synchronized between the electronic devices 602. The peer discovery process, in some instances, can also include user verification that communication the electronic devices 602 should occur. In some embodiments, peer discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, electronic devices that are attached to a power source, such as an electrical outlet, can continuously perform advertisement and discovery for the peer-to-peer connection service. Mobile user devices can enable discovery of the peer-to-peer connection service based on the location of the user device. For example, and in one embodiment, a geo-fence trigger is enabled on the mobile device, such that peer-to-peer connection discovery is enabled when the mobile device is within a geographic proximity to a location designated as the home location of the user device.

When one of the electronic devices 602 is discovered by another one of the electronic devices 602, a network data connection (e.g., TCP, UDP, etc.) can be established between the devices. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such embodiment, a data connection cannot be established between devices until some form of data exchange is performed between devices, such as, for example, if the devices are in wireless radio range of each other. Alternatively, the devices each come into possession of shared secret data, which can be distributed to the devices if the devices are each associated with a user account of a family of user accounts. This pre-connection data exchange can enable the electronic devices 602 to learn a persistent identifier for each device that can be used to establish a peer-to-peer connection. Once a data connection is established, a secure communication session can be established between the communal smart home device and the companion device. The communal smart home device and the connected companion device can then exchange presence and reachability information. Once interconnected, the electronic devices 602 can enter a wake-on-wireless (WoW) state as needed, when data is not being exchanged over the peer-to-peer connection. In one embodiment, an electronic device that is connected to a power source can remain active to reduce first-message latency.

In the event connectivity is lost between electronic devices 602, the discovery service can be re-enabled and used to search for the device on the local network. If the missing device is re-discovered, the data connection between devices can be re-established. If the missing device cannot be discovered, state discovery service information in the records of the missing device is reconfirmed and cleaned.

The searching device can then attempt to establish communication with the missing device via a secure internet session. In one embodiment, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established over the network 620 with the previously missing device, peer-to-peer connection messages can be exchanged over the secure Internet connection.

In the event that interconnected electronic devices 602 are connected over the network 620 (e.g., via an Internet-based connection) and a local connection becomes available, a peer-to-peer connection can be established via the electronic devices 602. For example, if mobile phone 602E were to cross a geo-fence boundary, the mobile phone 602E can enable a discovery protocol (e.g., SSDP, Bonjour, etc.) to search for other electronic devices 602. In one embodiment, connection switching can be performed whenever connectivity is lost between connected electronic devices 602 or if the devices determine that a better connection is available. Local connections can be preferred to Internet connections, as local connections presumably are lower latency. Additionally, it may be less resource intensive from a device and infrastructure standpoint to maintain a local connection instead of an Internet connection. For example, where device behavior or activity synchronization is to occur between electronic devices 602 via the one or more servers 640 over the network 620, the rate of data exchange between the electronic devices 602 may be throttled due to server demand. In one embodiment, electronic device 602 can provide updates to certain types of data to the one or more servers 640 only during specified update interval for the electronic device 602. Further updates may be delayed until the next update interval. However, local data exchange between the electronic devices 602 can occur unthrottled and at lower latency using a peer-to-peer connection between devices. In one embodiment, the various peer-to-peer connection can be used as a mesh-rely to propagate device activity updates across the set of electronic devices 602, provided that the electronic devices have an established trust relationship.

In one embodiment, some devices, such as the wearable device 602F (e.g., electronic watch device or another wearable electronic accessory) can synchronize data over a peer-to-peer channel with another device (e.g., a mobile phone device 602E) while also synchronizing data via a connection over a network-centric channel via the network 620. For example, the wearable device 602F can have a primary synchronization channel with a companion electronic device, such the mobile phone device 602E. The wearable device 602F can also receive synchronization data via a network centric channel, for example, while the wearable device 602F is charging. In one embodiment, some data to be synchronized with the wearable device 602F can be synchronized with the mobile phone device 602E or another companion device. Dividing synchronization duties between the wearable device 602F and the mobile phone 602E can enable rich data to be delivered to the wearable device 602F in a timely manner without negatively impacting the power and performance of the wearable device 602F. In one embodiment, data stored on the wearable device 602F can be periodically stored to remote storage of the servers 640 as backup data, even if such data will not be immediately synced with other devices.

Figure 7:
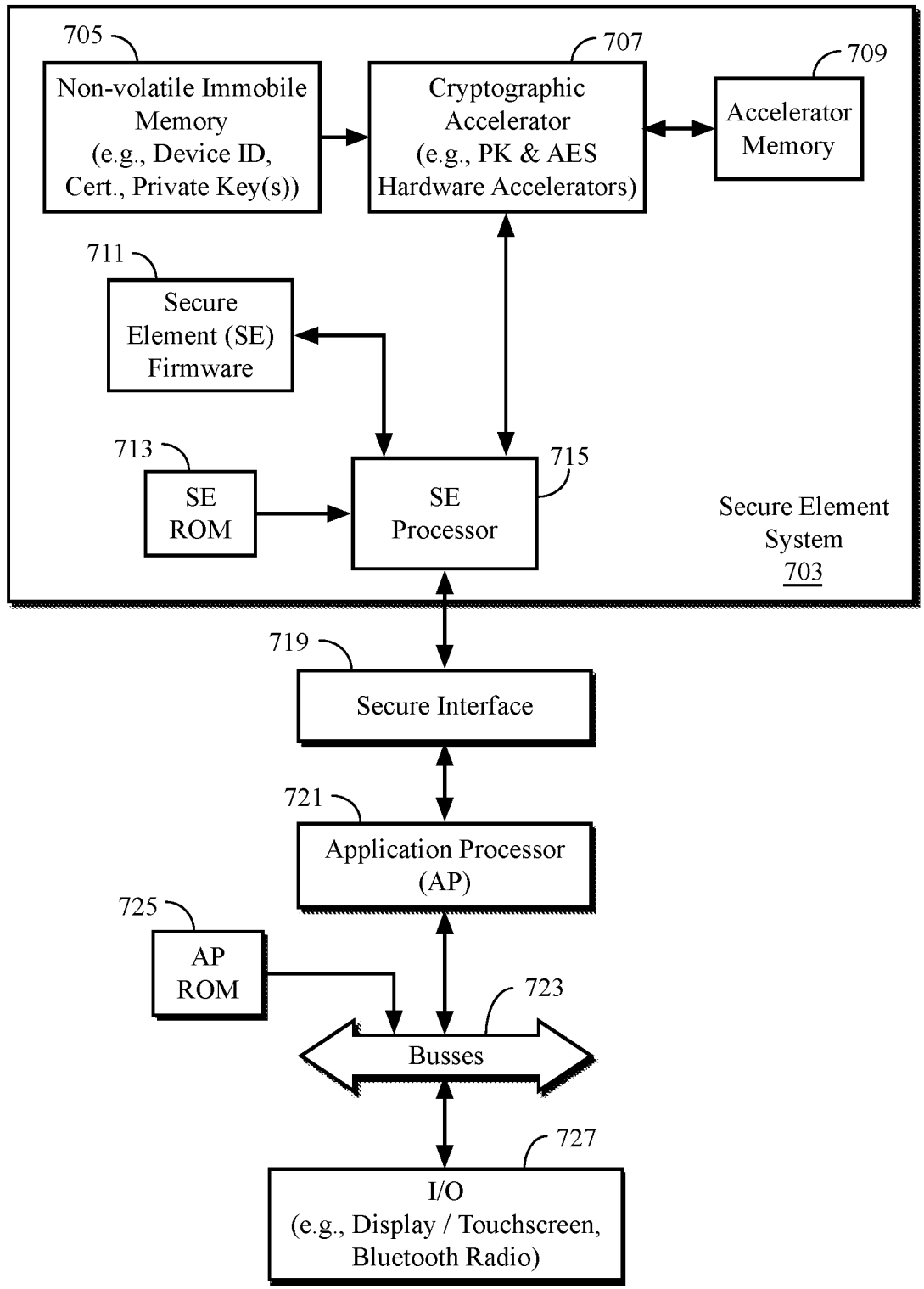
FIG. 7 illustrates a computing system including a secure processor, according to an embodiment.

FIG. 7 illustrates a computing system 700 including a secure processor, according to an embodiment. The illustrated secure processor is a secure element processor, although other types of secure processors may be used by embodiments described herein. The computing system 700 can enable a device to perform secure accelerated cryptographic operations and provide secure storage for private keys. The computing system 700 includes an application processor 721 that is communicably coupled with a secure element system 703 via a secure interface 719. The computing system 700 can be a portion of any of the client devices described herein. Additionally, the computing system 700 can be included into one or more of the servers described herein. In one embodiment, the secure element system 703 can be implemented as a system on chip. In another embodiment, the application processor 721 and the secure element system 703 can be implemented on a system on chip and include one or more processors and memory controllers and other components on a single integrated circuit.

The secure element system 703 can perform cryptographic operations as described herein, as well as other system security operations such as encrypting user files or verifying code signatures, processing user passcodes, or performing other security operations. The cryptographic operations can be performed in part by the secure element processor 715 by executing software stored as firmware 711 in the secure element system 703. The secure element processor 715 can also be coupled to a secure element ROM 713 which can be trusted software that can validate the software in the firmware 711 before allowing that firmware to execute by checking a code signature of the firmware and verifying that the signature code indicates that the firmware is valid and has not been corrupted before allowing the firmware to be executed by the secure element processor 715.

The secure element system 703 can also include a cryptographic accelerator such as cryptographic accelerator 707 which can perform asymmetric cryptography as well as symmetric cryptography using a hardware accelerator. The cryptographic accelerator 707 can be coupled to memory 705, which can be non-volatile and immutable memory that stores, in a secure manner, a device identifier or a set of device identifiers and a set of one or more certificates and private keys. In one embodiment, information stored in memory 705 can be hidden from the rest of the system and is not readable by the rest of the system. The cryptographic accelerator 707 has access to the private keys and other data within the memory 705 and access to the memory 705 is not allowed for components outside of the secure element system 703. In one embodiment, the cryptographic accelerator 707 can be coupled to an accelerator memory 709 which can be a scratch pad memory used to perform the cryptographic operations that are performed by the cryptographic accelerator 707. The application processor 721 can be coupled to one or more buses 723 which are coupled to one or more input and output (I/O) devices 727, such as a touchscreen display and a Bluetooth radio, etc. Other input and output devices can be included. The application processor 721 is also coupled to an application processor ROM 725, which provides software to boot up the application processor. Similarly, the secure element ROM 713 provides code to boot up the secure element processor 715.

Figure 8:
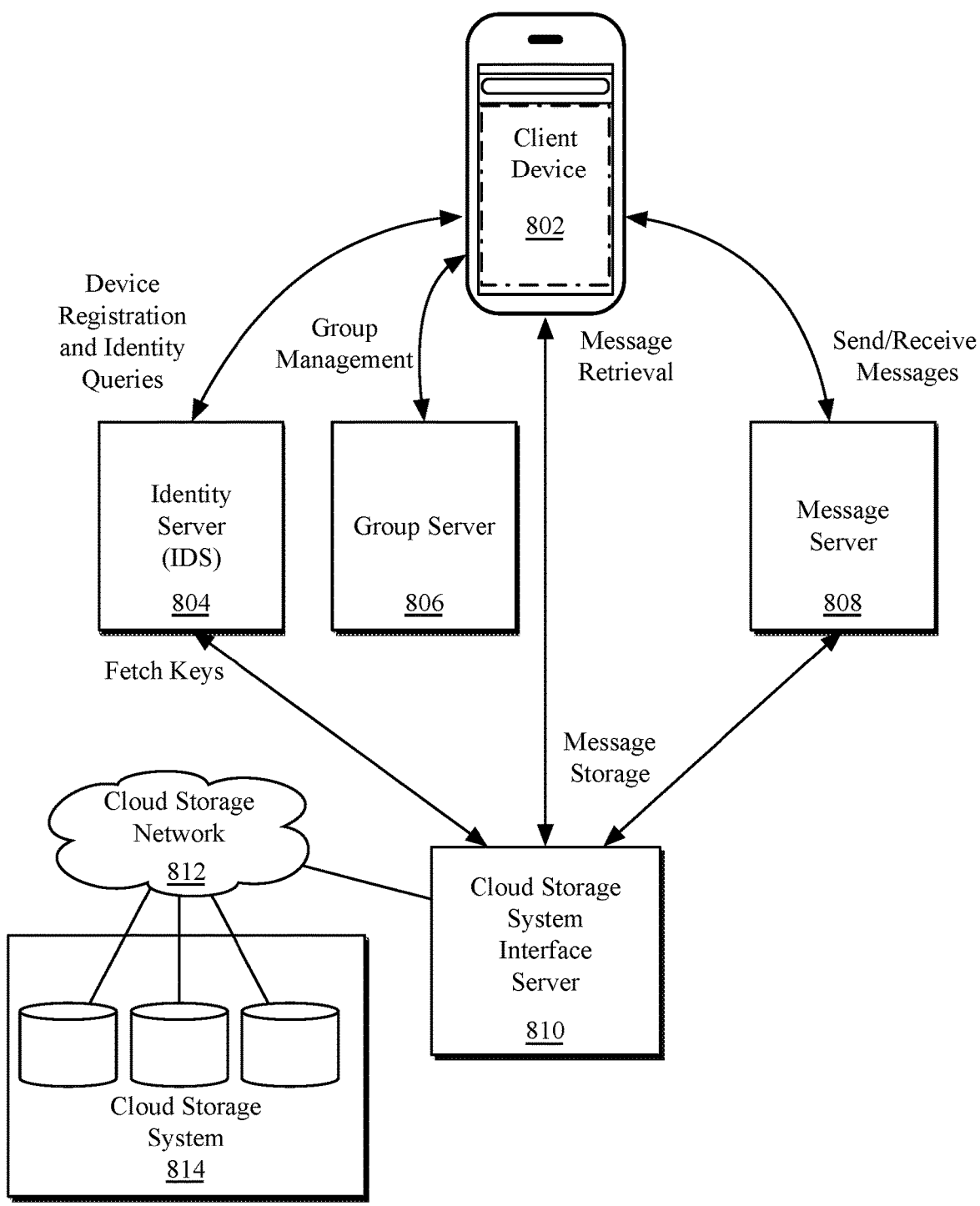
FIG. 8 illustrates an exemplary server infrastructure, according to an embodiment.

FIG. 8 illustrates an exemplary server infrastructure 800, according to an embodiment. The message system described herein can use multiple servers to enable seamless transmission of encrypted messages and attachments. The servers can include one or more identity servers 804, one or more group servers 806, one or more message servers 808, and one or more cloud storage system interface servers 810. A client device 802 of a user can register the device with the online account by uploading a set of long-term device keys to an identity server 804. The identity server 804 then associates the client device with the online account. The identity server 804 can verify that the device is a legitimate device using device specific authentication keys associated with the device.

The group server 806 can assist with group management for message groups. A cloud storage system can use a set of multiple group servers, where group server 806 is one of several group servers in the set. To enable messaging between a group of users, a group key for the group is created in one embodiment. The device that creates the group is the group sponsor and sponsors the creation of the group via the group server 806 in one embodiment. The group server 806 can store an anonymous blob containing the cryptographic material that allows the members of the group to recover the group key. Once a group blob for the group has been created and accepted by the group server 806, the group blob is sent to all the devices involved in the group, to allow the devices to derive the group key.

Subsequent changes to the group, such as membership changes, are also performed via the group server 806 to ensure group changes are atomic. In the event that multiple group members attempt to change a group, the group server 806 coordinates the changes. The coordinated changes are then propagated to the group members. If a member does not have the current state of a group, attempted group changes from the member will be rejected until the member receives the updated group information. Additionally, the group server 806 enables garbage collection of group blobs. A locked group blob can be garbage collected, as the locked group blob indicates that the group has moved on to a new group blob.

The message server 808 enables instantaneous encrypted messaging between online client devices. In the event a receiving device is offline or message delivery cannot be verified, the message server 808 can temporarily store the message to a cloud storage system. The message server 808 can be configured to re-encrypt the encrypted message and attachments before storing the message to create an anonymized encrypted message to prevent an adversary having access to the cloud storage system from generating a social graph between users based on the presence of identical encrypted messages within the cloud storage accounts of the users.

The cloud storage system interface server 810 provides an interface mechanism for the client device and the message server 808 to access cloud storage associated with the online accounts of users that send messages via the messaging system. The cloud storage system interface server 810 connects to a cloud storage network 812 that abstracts a distributed cloud storage system 814. The cloud storage system 814 can be a single cloud storage system from a single storage provider or can be a collection of multiple cloud storage systems managed by multiple cloud storage providers. The cloud storage system interface server 810 can communicate with the identity server 804 to retrieve key material that is used to authenticate an account and client device before access is granted to the cloud storage associated with the account. The cloud storage system interface server 810 can also enable short term message storage for the message server 808 and long-term message storage for the client device 802. Short-term message storage is provided to the message server 808 in the event a receiving device cannot be reached to deliver a message. These undelivered messages can be stored in a private database associated with the user account that is to receive the message. The client device can then retrieve the messages when the client device is online. Long term message storage can be provided to the client device in the form of device backups and both messages and attachments of the user's cloud storage account can be anonymized by re-encrypting as described herein. The messages stored on the client device can be aggregated and stored within an account specific cloud storage location within the cloud storage system. The aggregation can be performed by the client device 802, the cloud storage system interface server 810, or the cloud storage system.

In addition to the IES techniques described herein, one embodiment provides a cryptographic system based on the key encapsulation mechanism (KEM). In such embodiment, KEM is used to provide post-quantum public key encryption and authenticated key exchange that may be executed on a classical computing system but is resistant to attacks by an adversary in possession of a quantum computer.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 9:
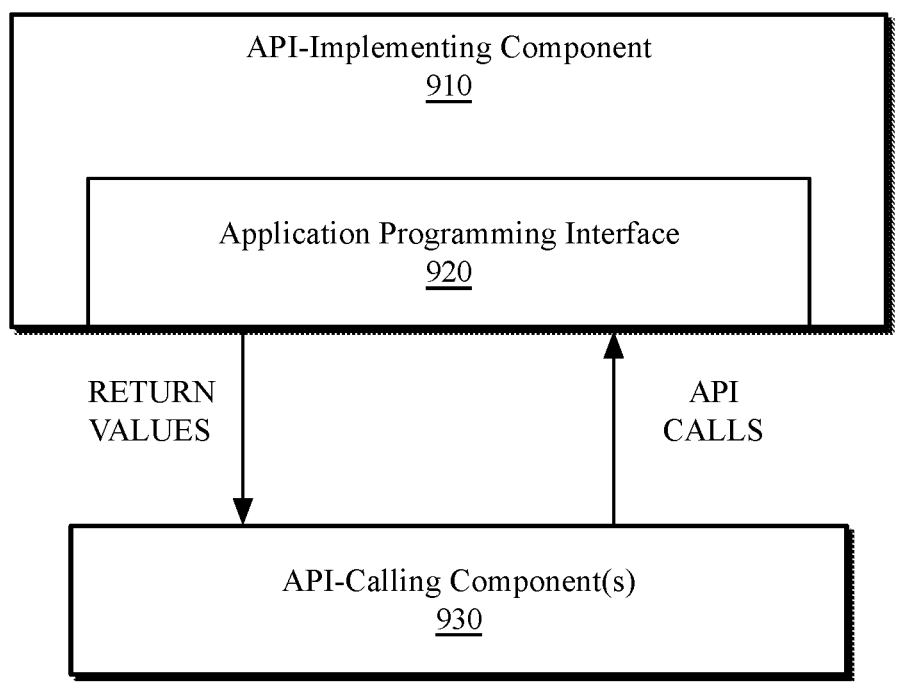
FIG. 9 is a block diagram illustrating an exemplary API architecture, which may be used in some embodiments of the invention.

FIG. 9 is a block diagram illustrating an exemplary API architecture, which may be used in some embodiments of the invention. As shown in FIG. 9, the API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 10A:
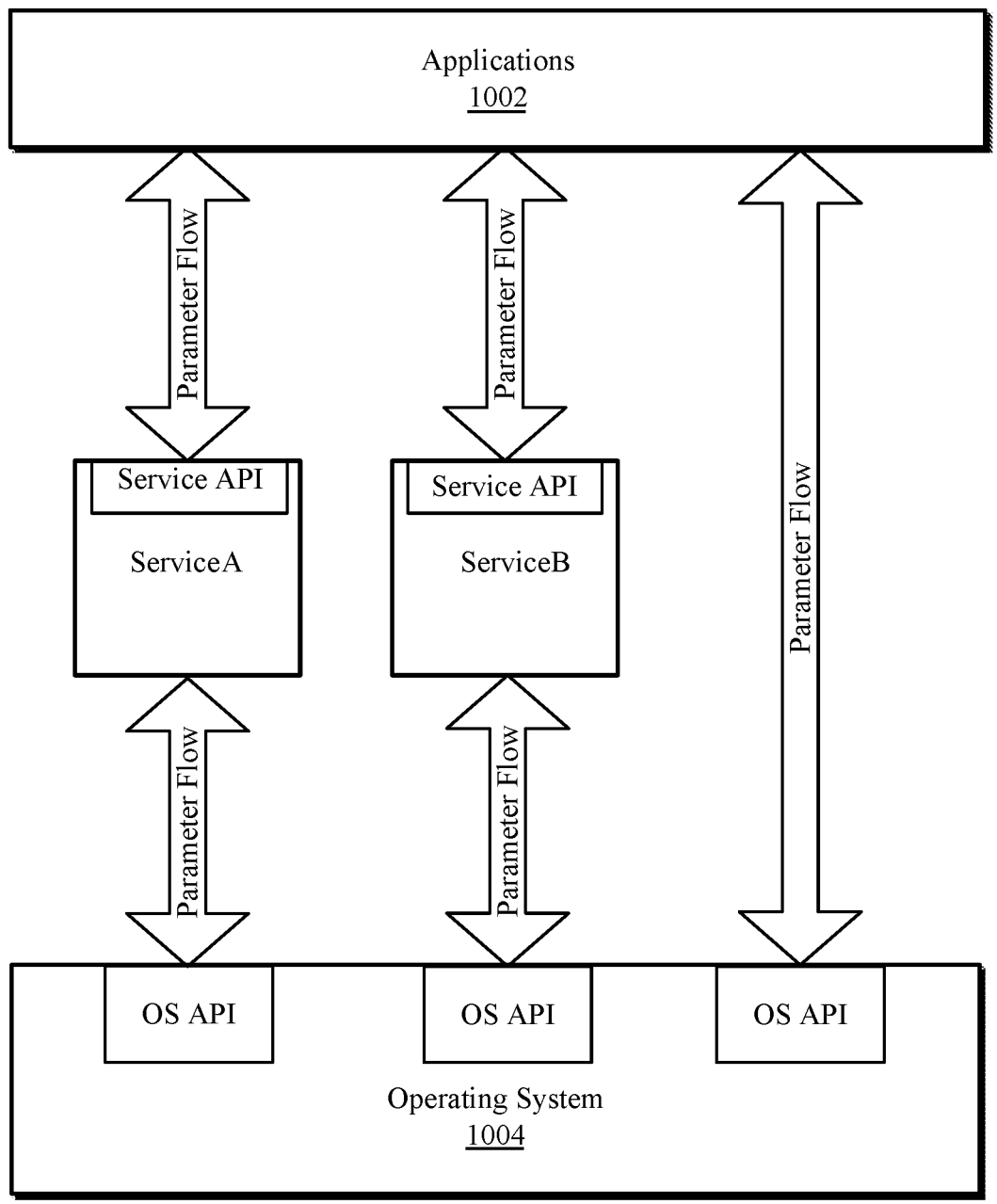
FIG. 10A-10B are block diagrams of exemplary API software stacks according to embodiments.
Figure 10B:
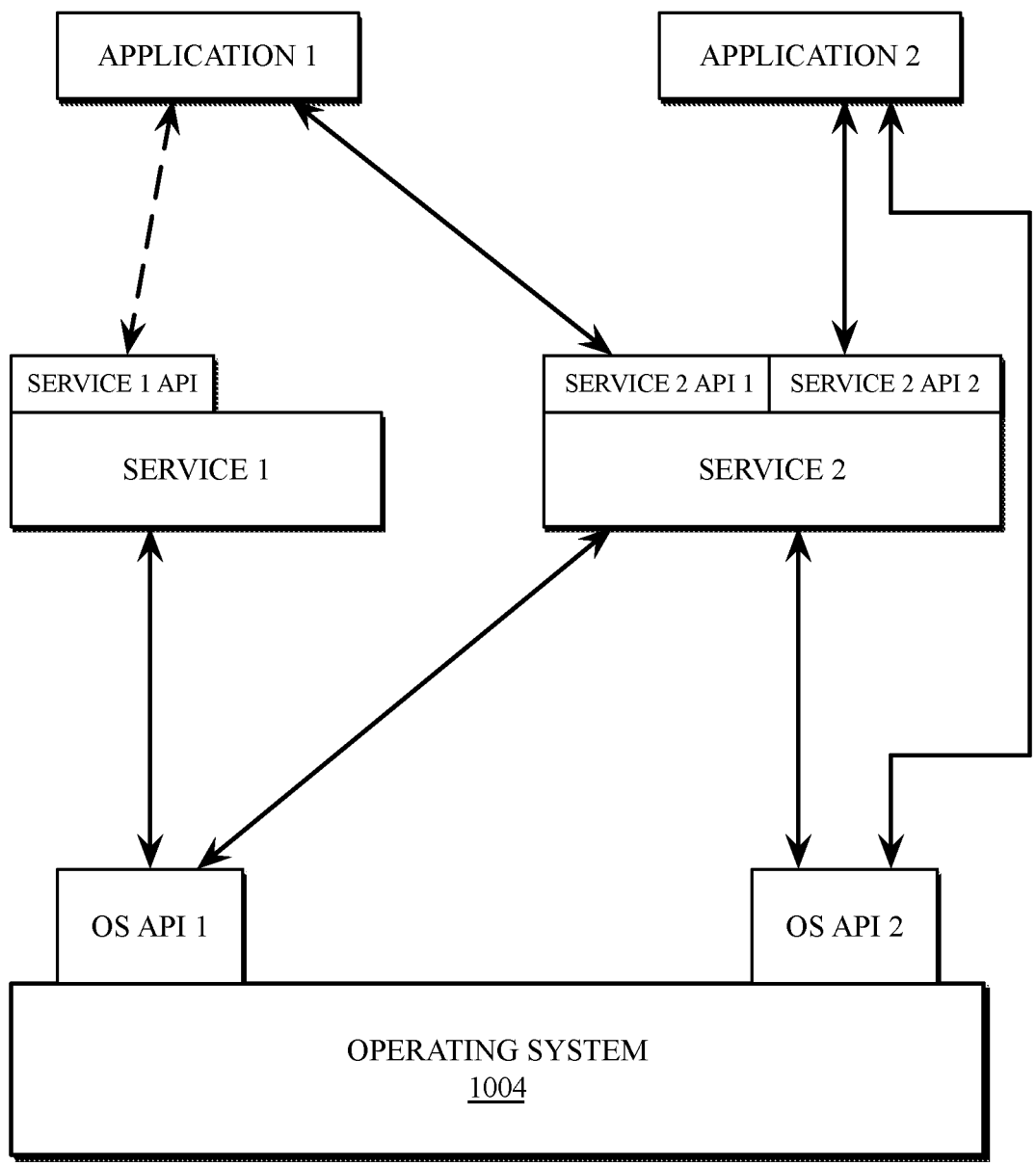

FIG. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary API software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 11:
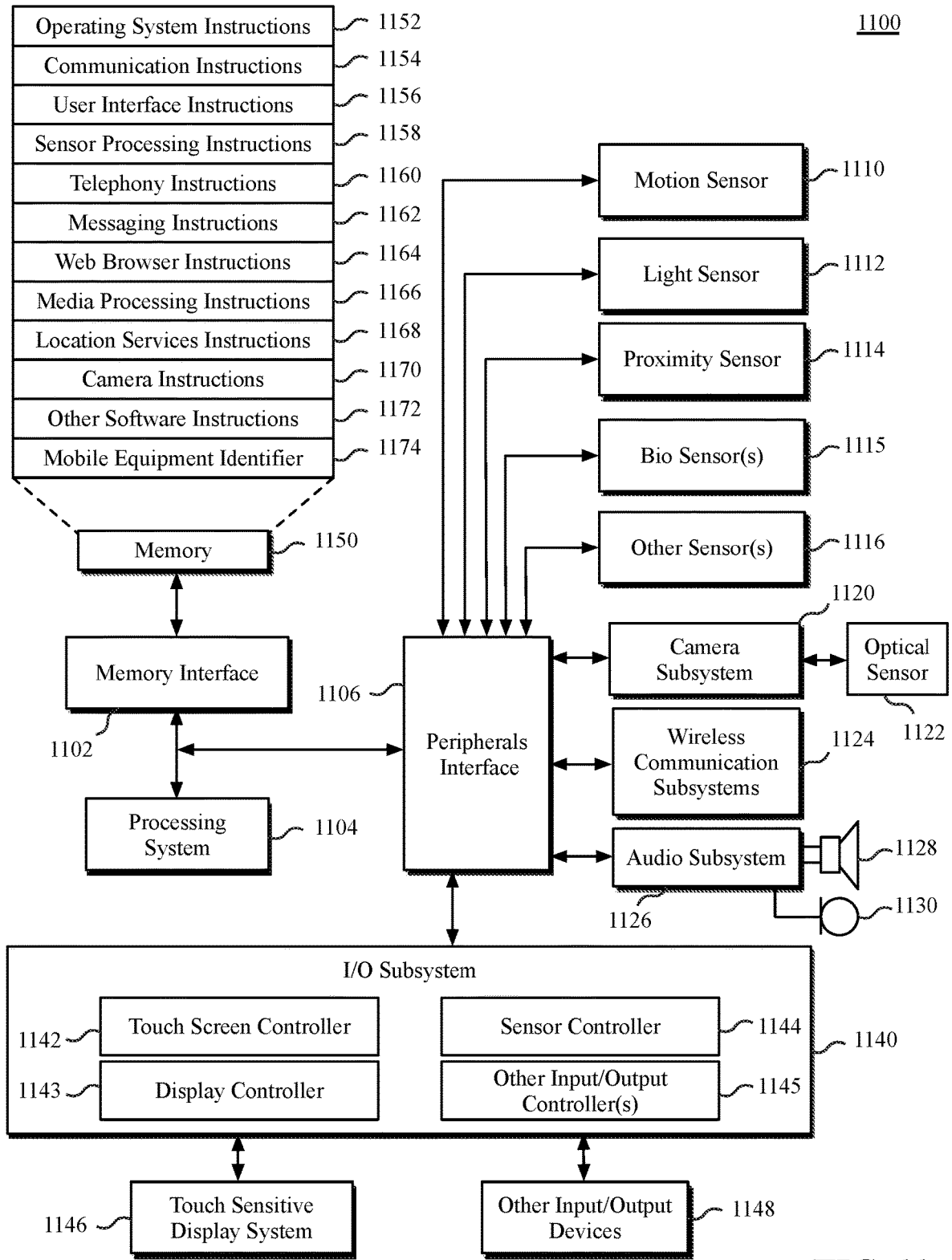
FIG. 11 is a block diagram of a device architecture for a mobile or embedded device, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The various components can be coupled by one or more communication buses or signal lines. The various components can be separate logical components or devices or can be integrated in one or more integrated circuits, such as in a system on a chip integrated circuit. The memory interface 1102 can be coupled to memory 1150, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters that can be configured receive or transmit data packets and/or data streams from a remote source. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment, the display controller 1143 can provide frame data to the touch sensitive display system 1146 at a variable frame rate.

In one embodiment, a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment, the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (MEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
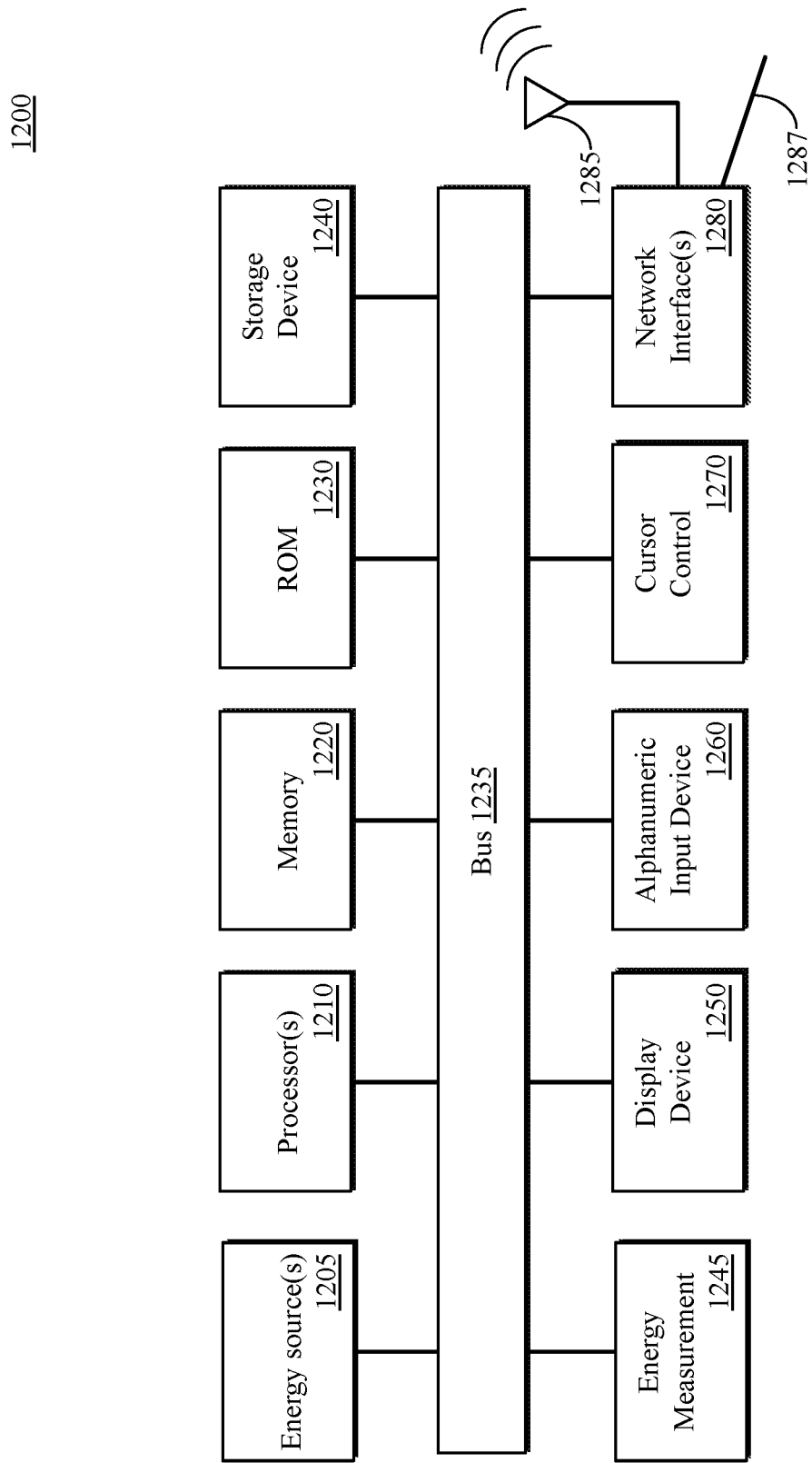
FIG. 12 is a block diagram of a computing system, according to an embodiment.

FIG. 12 is a block diagram of a computing system 1200, according to an embodiment. The illustrated computing system 1200 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1200 can be used to provide the computing device and/or a server device to which the computing device may connect.

The computing system 1200 includes bus 1235 or other communication device to communicate information, and processor(s) 1210 coupled to bus 1235 that may process information. While the computing system 1200 is illustrated with a single processor, the computing system 1200 may include multiple processors and/or co-processors. The computing system 1200 further may include memory 1220, such as random-access memory (RAM) or other dynamic storage device coupled to the bus 1235. The memory 1220 may store information and instructions that may be executed by processor(s) 1210. The memory 1220 may also be used to store temporary variables or other intermediate information during execution of instructions by the processor(s) 1210.

The computing system 1200 may also include read only memory (ROM) 1230 and/or another data storage device 1240 coupled to the bus 1235 that may store information and instructions for the processor(s) 1210. The data storage device 1240 can be or include a variety of storage devices, such as a flash memory device, a magnetic disk, or an optical disc and may be coupled to computing system 1200 via the bus 1235 or via a remote peripheral interface.

The computing system 1200 may also be coupled, via the bus 1235, to a display device 1250 to display information to a user. The computing system 1200 can also include an alphanumeric input device 1260, including alphanumeric and other keys, which may be coupled to bus 1235 to communicate information and command selections to processor(s) 1210. Another type of user input device includes a cursor control 1270 device, such as a touchpad, a mouse, a trackball, or cursor direction keys to communicate direction information and command selections to processor(s) 1210 and to control cursor movement on the display device 1250. The computing system 1200 may also receive user input from a remote device that is communicatively coupled via one or more network interface(s) 1280.

The computing system 1200 further may include one or more network interface(s) 1280 to provide access to a network, such as a local area network. The network interface(s) 1280 may include, for example, a wireless network interface having antenna 1285, which may represent one or more antenna(e). The computing system 1200 can include multiple wireless network interfaces such as a combination of Bluetooth®, near field communication (NFC), and/or cellular telephony interfaces. The network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one embodiment, the network interface(s) 1280 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1200 can further include one or more energy sources 1205 and one or more energy measurement systems 1245. Energy sources 1205 can include an AC/DC adapter coupled to an external power source, one or more batteries, one or more charge storage devices, a USB charger, or other energy source. Energy measurement systems include at least one voltage or amperage measuring device that can measure energy consumed by the computing system 1200 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides for an electronic device, comprising a network interface, a memory coupled with the network interface, at least one application processor coupled with the memory, the at least one processor to execute instructions stored in the memory, and a secure processor including a cryptographic engine, wherein the cryptographic engine is to generate a sealed encrypted message to be transmitted via the network interface, the sealed encrypted message encrypted on behalf of the at least one application processor and includes a signature to enable integrity verification of the sealed encrypted message, the signature generated based on an identity key of the electronic device and data including ciphertext of the encrypted message and a public key of a recipient of the sealed encrypted message.

One embodiment provides for a method comprising, at an electronic device with one or more processors and memory: fetching, from a key server, a public prekey and device identity key for a recipient of a message to be sent by the electronic device along with a timestamp and signature for the prekey. The method additionally comprises validating the fetched signature of the prekey and prekey timestamp using the fetched device identity public key for the recipient of the message, compose an inner message from a source message and a counter value; encrypt the inner message to generate ciphertext, generate a message signature based on the ciphertext, generate a sealed outer message including the ciphertext and the message signature, and sending the sealed outer message to the recipient of the message via a network interface.

One embodiment provides for a non-transitory machine-readable medium storing instructions to cause one or more processors to perform operations comprising receiving a sealed outer message from a sending device, fetching, from a key server, an identity public key for the sending device, parsing the sealed outer message to retrieve a ciphertext, a public randomized key, and a signature, for a private prekey in a prekey array, decoding and verifying the signature for the sealed message, keys, and ciphertext using the public randomized key and the private prekey, in response to verifying the signature for the sealed message, keys, and ciphertext, deserializing an inner message decoded from the ciphertext to retrieve the plaintext message and a counter value, validating the plaintext via the counter value, and outputting the plaintext message in response to validating the plaintext via the counter value.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device, comprising:
a network interface;
a memory coupled with the network interface;
at least one application processor coupled with the memory, the at least one application processor to execute instructions stored in the memory; and
a processor including a secure processing region, wherein the processor, via the secure processing region, is configured to generate a sealed encrypted message on behalf of the at least one application processor, wherein the sealed encrypted message includes ciphertext of an encrypted message and a signature to enable integrity verification of the sealed encrypted message, wherein the signature is generated using:
(i) a private identity key of the electronic device, and
(ii) data that includes the ciphertext of the encrypted message and a public key of a recipient of the sealed encrypted message, and
wherein the at least one application processor is configured to cause the sealed encrypted message to be transmitted to the recipient via the network interface.

2. The electronic device as in claim 1, wherein the secure processing region includes a cryptographic engine to generate key material used to generate the sealed encrypted message, the key material includes a device ephemeral key pair and a device identity key pair.

3. The electronic device as in claim 2, wherein the cryptographic engine is further to generate the signature for a public ephemeral key of the device ephemeral key pair, and transmit the signature and public keys of the key material to the at least one application processor, wherein the device identity key pair comprises persistent keys, the device ephemeral key pair is associated with a time-to-live, and the public key of the recipient of the sealed encrypted message is a public ephemeral key of the recipient.

4. The electronic device as in claim 3, wherein to generate the signature of the public ephemeral key of the device ephemeral key pair, the cryptographic engine is to perform a cryptographic operation with the public ephemeral key of the device ephemeral key pair as data and a public identity key of the device identity key pair as a cryptographic key.

5. The electronic device as in claim 4, wherein the data used to generate the signature of the public ephemeral key of the device ephemeral key pair additionally includes a generation timestamp for the public ephemeral key.

6. The electronic device as in claim 5, wherein the at least one application processor is to transmit public keys of the key material to a key server via the network interface.

7. The electronic device as in claim 6, wherein the at least one application processor is to generate an inner message including data to be transmitted via the network interface and a counter value associated with the data.

8. The electronic device as in claim 7, the at least one application processor additionally to retrieve, from the key server, a public ephemeral key of a recipient of the sealed encrypted message, a timestamp, and a signature associated with the timestamp and the public ephemeral key of the recipient of the sealed encrypted message, the at least one application processor further to validate the public ephemeral key via the timestamp and the signature associated with the timestamp and the public ephemeral key of the recipient of the sealed encrypted message.

9. The electronic device as in claim 8, the at least one application processor additionally to request the processor to encrypt the inner message via the public ephemeral key of the recipient of the sealed encrypted message and generate the signature to enable integrity verification of the sealed encrypted message based on ciphertext of an encrypted inner message and a private key of the device identity key pair.

10. The electronic device as in claim 9, wherein to generate the sealed encrypted message, the at least one application processor is to serialize the ciphertext, the signature to enable integrity verification of the sealed encrypted message, and a randomized key generated during encryption of the inner message.

11. A method comprising:
at an electronic device with one or more processors and memory:
fetching, from a key server, a public prekey and a public device identity key for a recipient of a message to be sent by the electronic device;
fetching, from the key server, a timestamp and a signature for the public prekey;
validating the signature of the public prekey and the timestamp using the public device identity key for the recipient of the message;
composing an inner message from a source message and a counter value, the counter value to enable validation of the inner message;
encrypting the inner message to generate a ciphertext;
generating a message signature using: (i) a private device identity key, and (ii) the ciphertext and the public device identity key of the recipient of the message;
generating a sealed outer message, the sealed outer message including the ciphertext and the message signature; and
sending the sealed outer message to the recipient of the message via a network interface.

12. The method as in claim 11, wherein encrypting the inner message includes generating a randomized key pair including a public randomized key and a private randomized key, and generating the ciphertext of the inner message based in part on the private randomized key.

13. The method as in claim 12, wherein the sealed outer message additionally includes the public randomized key.

14. The method as in claim 11, wherein the public prekey is an ephemeral key having a time to live.

15. A non-transitory machine-readable medium storing instructions to cause one or more processors to perform operations comprising:
receiving a sealed outer message from a sending device;
fetching, from a key server, a public identity key for the sending device;
parsing the sealed outer message to retrieve a ciphertext, a public randomized key, and a signature;
for a private prekey in a prekey array, verifying the signature for the sealed outer message using: (i) the public randomized key, (ii) the public identity key for the sending device, and (iii) the private prekey;
in response to verifying the signature for the sealed outer message decoding the ciphertext to retrieve a plaintext message and a counter value;
validating the plaintext message via the counter value; and
outputting the plaintext message in response to validating the plaintext message via the counter value.

16. The non-transitory machine-readable medium as in claim 15, the operations additionally comprising validating the public identity key for the sending device.

17. The non-transitory machine-readable medium as in claim 16, the operations additionally comprising validating the public identity key for the sending device via an out-of-band key comparison.

18. The non-transitory machine-readable medium as in claim 15, in response to failing to verify the signature for the sealed outer message and the ciphertext for the private prekey in the prekey array, verifying the signature for the sealed outer message and the ciphertext using the public randomized key and a next private prekey in the prekey array.

19. The non-transitory machine-readable medium as in claim 15, wherein validating the plaintext message via the counter value includes performing a lookup of the counter value in a counter store.

20. The non-transitory machine-readable medium as in claim 19, the operations additionally including performing a lookup of the counter value in a receiving table of the counter store, the receiving table including a set of skipped values, the set of skipped values to enable out-of-order message receipt.

* * * * *